United States Patent Office 3,781,267
Patented Dec. 25, 1973

3,781,267
O-ESTERS OF MONOSACCHARIDES HAVING ETHER GROUPINGS
Roland Jaques, Allschwil, and Alberto Rossi, Oberwil, Basel-Land, Switzerland, assignors to Ciba-Geigy Corporation, Ardsley, N.Y.
No Drawing. Filed June 23, 1970, Ser. No. 49,185
Claims priority, application Switzerland, July 3, 1969, 10,204/69
Int. Cl. C07c 47/18, 69/32
U.S. Cl. 260—210 R
10 Claims

ABSTRACT OF THE DISCLOSURE

The invention concerns O-esters of monosaccharides with optionally substituted 2-R—O-benzoic acids, which ester compounds contain at least one saccharide hydroxy group esterified by a 2-R—O-benzoyl residue, in which R represents hydrogen, an optionally substituted hydrocarbon residue, or the acyl residue of an organic acid, and at least one saccharide-hydroxy group etherified by an optionally substituted hydrocarbon residue, and in which ester compounds further saccharide hydroxy groups may be free, etherified by an optionally substituted hydrocarbon residue, or esterified by the acyl residue of an organic acid, which exhibit antiinflammatory, antiarthritic and analgesic effects.

---

The present invention relates to O-esters of monosaccharides with optionally substituted 2-R—O-benzoic acids, these ester compounds containing at least one saccharide-hydroxy group esterified by a 2-R—O-benzoyl radical, in which R represents hydrogen, an optionally substituted hydrocarbon residue or the acyl radical of an organic acid, and at least one saccharide-hydroxy group etherified by an optionally substituted hydrocarbon residue and in which compounds further saccharide-hydroxy groups may be free, etherified by an optionally substituted hydrocarbon residue, or esterified by the acyl radical of an organic acid, or salts of compounds of this kind containing salt-forming groups.

Monosaccharides are aldoses or ketoses having 4 to 7, preferably 5 or 6, chain carbon atoms, especially aldopentoses and aldohexoses, and corresponding ketopentoses and ketohexoses; these compounds may be in the form of semi-acetals or semi-ketals, e.g. as the corresponding furanoses or pyranoses.

Aldopentoses are arabinoses, riboses, lyxoses and xyloses, whereas aldohexoses are primarily glucoses, mannoses, alloses, altroses, taloses, galactoses, idoses or guloses, furthermore corresponding desoxy compounds, such as 2-desoxyriboses, 6-desoxyglucoses or 6-desoxyidoses. These aldoses are in the form of D- or L-aldoses, preferably in the form of semiacetals and especially in the form of furanoses, as well as pyranoses, these compounds being mixtures of anomers or pure α- or pure β-anomers.

Ketopentoses are erythro-pentuloses or threo-pentuloses, whereas ketohexoses are alluloses, fructoses, sorboses or tagatoses, furthermore corresponding desoxy compounds. These ketoses are in the form of D- or L-ketoses, optionally in the form of semiketals; they may be in the form of anomer mixtures or pure anomers.

An optionally substituted 2-R—O-benzoyl radical may contain in addition to the R—O group in 2-position other substituents, such as one, two or several optionally substituted hydrocarbon residues and/or one, two or several functional groups. The radical R in the R—O-group is preferably hydrogen, but apart from representing an optionally substituted hydrocarbon radical may also stand for the acyl radical of an organic acid.

An optionally substitued hydrocarbon residue representing the group R or the etherifying portion of an O-ether grouping is, for example, an optionally substituted aliphatic, cycloaliphatic, cycloaliphatic-aliphatic, aromatic or araliphatic hydrocarbon radical.

The acyl radical of an organic acid is particularly that of an organic carboxylic acid, in which the organic portion is an optionally substituted hydrocarbon radical, such as an optionally substituted aliphatic, cycloaliphatic, cycloaliphatic-aliphatic, aromatic or araliphatic hydrocarbon radical, or a heterocyclic or heterocyclic-aliphatic radical, as well as the acyl radical of a semi-derivative of carbonic acid, especially of a carbonic acid semi-ester or of an optionally N-substituted carbonic acid semi-amide, in which the esterified portion or an N-substituent of the semi-amide is an optionally substituted hydrocarbon radical such as an optionally substituted aliphatic, cycloaliphatic, cycloaliphatic-aliphatic, aromatic or araliphatic hydrocarbon radical, or a heterocyclic or heterocyclic-aliphatic radical, furthermore the acyl radical of a corresponding organic sulfonic acid.

An aliphatic hydrocarbon radical is primarily a lower aliphatic hydrocarbon radical, especially a lower alkyl radical, as well as a lower alkenyl or lower alkinyl radical, which can, for example, contain up to 7, preferably up to 4, carbon atoms. Such radical can optionally be mono-, di- or polysubstituted by functional groups, for example, free, etherified or esterified hydroxyl or mercapto groups, such as lower alkoxy, lower alkenyloxy, lower alkylenedioxy, optionally substituted phenyloxy or phenyl-lower alkoxy, lower alkylmercapto or optionally substituted phenylmercapto or phenyl-lower alkyl-mercapto, lower alkoxycarbonyloxy or lower alkanoyloxy groups, as well as halogen atoms, furthermore by nitro groups, optionally substituted amino groups, acyl groups, such as lower alkanoyl groups, or carboxyl groups which are optionally functionally modified, such as lower alkoxycarbonyl, optionally N-substituted carbamoyl or cyano groups.

An optionally substituted cycloaliphatic or cycloaliphatic-aliphatic hydrocarbon radical is, for example, a monocyclic, bicyclic or polycyclic cycloalkyl or cycloalkenyl group, or cycloalkyl- or cycloalkenyl-lower alkyl or -lower alkenyl group, wherein a cycloalkyl radical, for example, contains up to 12, such as 3-8, preferably 3-6, ring carbon atoms, while a cycloalkenyl radical, for example, possesses up to 12, such as 3-8, preferably 5 or 6, ring carbon atoms as well as 1 to 2 double bonds, while the aliphatic portion of a cycloaliphatic-aliphatic radical can, for example, contain up to 7, preferably up to 4, carbon atoms. The above cycloaliphatic or cycloaliphatic-aliphatic radical can, if desired, be mono-, di- or polysubstituted, for example, by optionally substituted aliphatic hydrocarbon radicals, such as the above mentioned, optionally substituted lower alkyl groups or, for example, like the above-mentioned aliphatic hydrocarbon radicals, by functional groups.

An optionally substituted aromatic hydrocarbon radical is, for example, a monocyclic, bicyclic or polycyclic aromatic hydrocarbon radical, especially a phenyl radical, as well as a biphenylyl or naphthyl radical which can optionally be mono-, di- or polysubstituted, for example, like the above-mentioned aliphatic and cycloaliphatic hydrocarbon radicals.

An optionally substituted araliphatic hydrocarbon radical is, for example, an optionally substituted aliphatic hydrocarbon radical which, for example, contains up to 3 optionally substituted monocyclic, bicyclic or polycyclic aromatic hydrocarbon radicals, and primarily represents a phenyl-lower alkyl radical, as well as a phenyl-lower alkenyl or phenyl-lower alkinyl radical, such radicals containing, for example, 1 to 3 phenyl groups and being optionally mono-, di- or polysubstituted in the aromatic and/or aliphatic portion, for example, like the above-mentioned aliphatic and cycloaliphatic hydrocarbon radicals.

Heterocyclic radicals in heterocyclic or heterocyclic-aliphatic carboxylic acids are especially monocyclic, as well as bicyclic or polycyclic, preferably aza-, thia-, oxa-, thiaza-, oxaza- or diazacyclic radicals of aromatic character, which are optionally mono-, di- or polysubstituted, for example, like the aforementioned cycloaliphatic radicals. The aliphatic portion in heterocyclic-aliphatic radicals can, for example, have the meanings given for the corresponding cycloaliphatic-aliphatic or araliphatic radicals.

Acyl radicals R or acyl radicals esterifying hydroxy groups are in the first place radicals of aliphatic carboxylic acids, such as those of lower alkanecarboxylic acids, as well as lower alkenecarboxylic acids, furthermore of lower alkanedicarboxylic acids, as well as lower alkenedicarboxylic acids, or of aryl, as well as aryl-lower alkane or aryl-lower alkene carboxylic acids.

The esterifying organic portion in the acyl radical of a carbonic acid semi-ester is in the first place a lower alkoxycarbonyl radical optionally substituted in the lower alkyl portion, as well as a lower alkenyloxycarbonyl, cycloalkoxycarbonyl, phenyloxycarbonyl or phenyl-lower alkoxycarbonyl radical optionally substituted in the lower alkenyl, cycloalkyl, phenyl or phenyl-lower alkyl portion, furthermore a lower alkoxycarbonyl radical which in the lower alkyl radical contains an optionally substituted heterocyclic group of aromatic character.

Functional groups occurring as additional substituents of the 2-R—O-benzoyl radical are, for example, the aforementioned groups of this kind which occur in a substituted aliphatic hydrocarbon radical, such as free, etherified or esterified hydroxy or mercapto groups, e.g. lower alkoxy, lower alkenyloxy, lower alkylenedioxy, optionally substituted phenyloxy or phenyl-lower alkoxy, lower alkylmercapto or optionally substituted phenylmercapto or phenyl-lower alkylmercapto, lower alkoxycarbonyloxy or lower alkanoyloxy groups, as well as halogen atoms, furthermore nitro groups, optionally substituted amino groups, acyl groups, such as lower alkanoyl groups, or optionally functionally converted carboxy groups, such as lower alkoxycarbonyl groups, optionally N-substituted carbamoyl groups or cyano groups.

A lower alkyl radical is, for example, a methyl, ethyl, n-propyl, isopropyl, n-butyl, isobutyl, sec.-butyl or tert.-butyl group, as well as an n-pentyl, isopentyl, n-hexyl, isohexyl or n-heptyl group, whereas a lower alkenyl radical can be, for example, a vinyl, allyl, isopropenyl, 2- or 3-methallyl or 3-butenyl group, and a lower alkinyl radical is e.g. a propargyl or 2-butinyl group.

Etherified hydroxy groups denote in the first place lower alkoxy, for example, methoxy, ethoxy, n-propyloxy, isopropyloxy, n-butyloxy, isobutyloxy, sec.-butyloxy, tert.-butyloxy, n-pentyloxy or tert.-pentyloxy groups, as well as substituted lower alkoxy, such as halogeno-lower alkoxy groups, furthermore, lower alkenyloxy, for example, vinyloxy or allyloxy groups, lower alkylenedioxy, for example, methylenedioxy or ethylenedioxy, as well as isopropylidenedioxy groups, cycloalkoxy, for example cyclopentyloxy, cyclohexyloxy or adamatyloxy groups, phenyloxy groups, phenyl-lower alkoxy, for example, benzyloxy or 1- or 2-phenylethoxy groups, or lower alkoxy groups substituted by monocyclic monoaza-, monooxa- or monothiacyclic groups or aromatic character, such as pyridyl-lower alkoxy, for example, 2-pyridyl-methoxy groups, furyl-lower alkoxy, for example, furfuryloxy groups, or thienyl-lower alkoxy, for example, 2-thenyloxy groups.

Etherified mercapto groups are lower alkylmercapto, for example, methylmercapto or ethylmercapto groups, phenylmercapto groups or phenyl-lower alkylmercapto, for example, benzylmercapto groups.

Esterified hydroxy groups are in the first place halogen atoms, for example, fluorine, chlorine, bromine or iodine atoms, as well as lower alkanoyloxy groups, for example, acetyloxy or propionyloxy groups.

Substituted amino groups are mono- or disubstituted amino groups, in which the substituents are primarily optionally substituted mono- or divalent aliphatic, cycloaliphatic, cycloaliphatic-aliphatic, aromatic or araliphatic hydrocarbon radicals, as well as acyl groups. Such amino groups are especially lower alkyl-amino or di-lower alkylamino, for example, methylamino, ethylamino, dimethylamino or diethylamino groups, or lower alkylene-amino groups optionally interrupted by hetero, such as oxygen, sulfur or optionally, for example, by lower alkyl groups, substituted nitrogen atoms, such as pyrrolidino, piperidino, morpholino, thiomorpholino or 4-methyl-piperazino groups, as well as acylamino, especially lower alkanoylamino, such as acetylamino or propionylamino groups.

Lower alkanoyl groups are, for example, acetyl or propionyl groups.

A lower alkoxycarbonyl radical is, for example, a methoxycarbonyl, ethoxycarbonyl, n-propyloxycarbonyl, isopropyloxycarbonyl, tert.-butyloxycarbonyl or tert.-pentyloxycarbonyl group.

Optionally N-substituted carbamoyl groups are, for example, N-lower alkyl- or N,N-di-lower alkyl-carbamoyl, such as N-methyl-, N-ethyl-, N,N-dimethyl- or N,N-diethylcarbamoyl groups.

Substituted lower aliphatic hydrocarbon radicals preferably contain hydroxy or lower alkoxy groups and are in the first place hydroxy- or lower alkoxy-lower alkyl radicals, in which the hydroxy or lower alkoxy groups are preferably separated by at least 2 carbon atoms from the oxygen atom which carries a lower aliphatic radical substituted in this manner, and are, for example, 2-hydroxyethyl, 2-hydroxypropyl, 3-hydroxypropyl, 2,3-dihydroxypropyl, 2-methoxyethyl, 2-ethoxyethyl, 2-methoxypropyl, 3-methoxypropyl or 3-ethoxypropyl radicals, as well as hydroxymethyl radicals.

A cycloalkyl group is, for example, a cyclopropyl, cyclobutyl, cyclopentyl, cyclohexyl or cycloheptyl group, as well as an adamantyl group, and a cycloalkenyl group is, for example, a 2- or 3-cyclopentenyl, 1-, 2- or 3-cyclohexenyl or 3-cycloheptenyl group, as well as a 2-cyclopropenyl group. A cycloalkyl-lower alkyl or -lower alkenyl radical is, for example, a cyclopropyl-, cyclopentyl-, cyclohexyl- or cycloheptylmethyl, -1,1- or 1,2-ethyl, 1,1-, 1,2- or 1,3-propyl-, -vinyl or -allyl group, whereas a cycloalkenyl-lower alkyl or -lower alkenyl group is, for example, a 1-, 2- or 3-cyclopentenyl-, 1-, 2- or 3-cyclohexenyl- or 1-, 2- or 3-cycloheptenyl-methyl-, -1,1- or -1,2-ethyl, -1,1-, -1,2- or 1,2-propyl, -vinyl or -allyl group.

A naphthyl radical is a 1- or 2-naphthyl radical, whereas a biphenylyl group is, for example, a 4-biphenylyl radical.

A phenyl-lower alkyl or phenyl-lower alkenyl radical is in the first place a benzyl radical, as well as a 1- or 2-phenylethyl, 1-, 2- or 3-phenylpropyl, diphenylmethyl, trityl, 1- or 2-naphthylmethyl, styryl or cinnamyl radical. A substituted phenyl-lower alkyl radical is in the first place a benzyl radical which may be mono-, di- or polysubstituted in the phenyl nucleus and, in the case of polysubstitution, may carry different substituents. Substituents are especially halogen atoms or lower alkyl groups, as well as lower alkoxy or trifluoromethyl groups, the benzyl radical monosubstituted in the nucleus preferably carrying a substituent in para-position.

Heterocyclic radicals are, for example, monocyclic monoaza-, monothia- or monooxacyclic residues of aromatic character, such as pyridyl, for example, 2-pyridyl, 3-pyridyl or 4-pyridyl groups, thienyl, for example, 2-thienyl groups, or furyl, for example, 2-furyl groups, or bicyclic monoazacyclic radicals of aromatic character, such as quinolinyl, for example, 2-quinolinyl or 4-quinolinyl residues, or isoquinolinyl, for example, 1-isoquinolinyl residues, or monocyclic thiaza- or oxaza-, as well as diazacyclic residues of aromatic character, such as oxazolyl, isoxazolyl, thiazolyl or isothiazolyl, as well as pyrimidinyl radicals. Heterocyclic-aliphatic residues are lower alkyl or lower alkenyl radicals containing heterocyclic radicals, especially those mentioned above, as substituents.

Acyl radicals of lower alkanecarboxylic acids are especially those of acetic or propionic acid; those of lower alkanedicarboxylic acids, e.g. with 2-7, preferably 3-6, carbon atoms, or of lower alkane-dicarboxylic acids, e.g. with 4-7 carbon atoms, are, for example those of malonic, 2-methylsuccinic, glutaric, 3-methylglutaric, 3-ethylglutaric, adipic or pimelic acid, above all of succinic acid, as well as of maleic or fumaric acid.

Acyl radicals of organic sulfonic acids are, for example, those of aliphatic or aromatic sulfonic acids, in which the aliphatic and aromatic portions have the meanings given above, such as lower alkanesulfonic, for example, methane- or ethanesulfonic acids, or arylsulfonic, for example, benzene- or toluenesulfonic acids.

A lower alkenyloxycarbonyl group is, for example, the vinyloxycarbonyl group, whereas cycloalkoxy-carbonyl groups and phenyl-lower alkoxycarbonyl groups, in which the cycloalkyl or phenyl-lower alkyl radical have, for example, the meanings given above, are e.g. adamantyloxycarbonyl, benzyloxycarbonyl or diphenylmethoxycarbonyl, as well as α-4-biphenylyl-α-methyl-ethoxycarbonyl groups. Lower alkoxycarbonyl groups, in which the lower alkyl radical contains, for example, a monocyclic monoaza-, monooxa- or monothiacyclic group, are, for example, furyl-lower alkoxy-carbonyl, such as furfuryloxycarbonyl, or thienyl-lower alkoxy-carbonyl, such as 2-thenyloxycarbonyl groups.

An optionally substituted 2-R—O-benzoyl radical is a 2-R—O-benzoyl radical containing, for example, lower alkyl, hydroxy, lower alkoxy, lower alkylenedioxy, carboxy, carbo-lower alkoxy or trifluoromethyl groups or halogen atoms, as well as phenyl or halogenophenyl, such as 4-fluorophenyl groups, the latter preferably in 5-position, in which the residue R primarily represents a hydrogen atom or else preferably a lower alkanoyl, furthermore a lower alkyl radical, such as a methyl, or a phenyl-lower alkyl, such as a benzyl radical.

The new compounds have valuable pharmacological properties and can be used accordingly. They have in particular novel anti-inflammatory and, unlike known compounds of similar structure, antinociceptive (analgesic) properties coupled with a low degree of toxicity. Contrary to known compounds having a similar structure, the new compounds have a pronounced anti-inflammatory action in the kaolin-paw-edema test [carried out according to Riesterer and Jaques, Helv. Physiol. et Pharmacol. Acta, Vol. 25, p. 156–159 (1969) with peroral instead of local administration] in rats with doses of about 0.1 g./kg. to about 1 g./kg. and in the adjuvans-arthritis test [adaptation of the process described by Newbould, Brit. J. Pharmacol, Vol. 21, p. 127–136 (1936)] in rats on oral administration in doses of about 0.1 g./kg. to about 1 g./kg. Furthermore, a pronounced analgesic component can be observed on oral administration of doses of about 0.05 g./kg. to about 0.3 g./kg. to mice in the benzoquinone-writhing-syndrome test [adaptation of the test procedure described by Siegmund et al. in Proc. Soc. Exptl. Biol. Med., Vol. 95, pp. 729–733 (1957)]. The new compounds are, therefore, useful as anti-inflammatory (antiphlogistic) compounds, for example, as agents having an anti-exsudative action or an inhibiting action on the permeability of vessels, in the first place as compounds having antiarthritic and analgesic effects, especially for the treatment of inflammations of rheumatic nature.

They are also valuable as intermediates, for example, for the manufacture of other, especially pharmacologically, active compounds.

The invention comprises primarily hexofuranose compounds of the formula

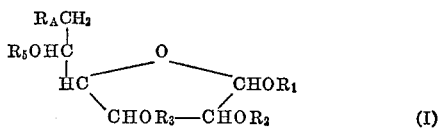

(I)

in which $R_1$ represents a hydrogen atom or an optionally substituted aliphatic, cycloaliphatic, cycloaliphatic-aliphatic or araliphatic hydrocarbon radical, and $R_A$ stands for a hydrogen atom or a radical of the formula R—O—, and in which each of the radicals $R_2$, $R_3$, $R_5$ and $R_6$ stands for hydrogen, an optionally substituted aliphatic, cycloaliphatic, cycloaliphatic-aliphatic, aromatic or araliphatic hydrocarbon radical or the acyl radical of an organic acid, with the proviso that at least one of the radicals $R_3$, $R_5$ and $R_6$ represents an optionally substituted 2-R'—O-benzoyl group, in which R' represents hydrogen, an optionally substituted aliphatic, cycloaliphatic, cycloaliphatic-aliphatic, aromatic or araliphatic hydrocarbon radical or the acyl radical of an organic acid, and at least one of the groups $R_1$, $R_2$, $R_3$, $R_5$ and $R_6$ stands for one of the optionally substituted hydrocarbon radicals indicated for these groups, primarily hexofuranose compounds of the Formula I, in which $R_1$ and $R_A$ have the meanings indicated above, each of the radicals $R_3$, $R_5$ and $R_6$ stands for an optionally substituted aliphatic, cycloaliphatic, cycloaliphatic-aliphatic, aromatic or araliphatic hydrocarbon radical or for the acyl radical of an organic acid, and $R_2$ represents hydrogen, an optionally substituted aliphatic, cycloaliphatic, cycloaliphatic-aliphatic or araliphatic hydrocarbon radical or the acyl radical of an organic acid, with the proviso that at least one of the radicals $R_3$, $R_5$ and $R_6$ represents an optionally substituted 2-R'—O-benzoyl group, in which R' represents hydrogen, an optionally substituted aliphatic, cycloaliphatic, cycloaliphatic-aliphatic or araliphatic hydrocarbon radical or the acyl radical of an organic acid, and with the further proviso that at least one of the radicals $R_1$, $R_2$, $R_3$, $R_5$ and $R_6$ represents one of the aforementioned optionally substituted hydrocarbon radicals, and salts of a compound of this kind containing a salt-forming group.

The compounds of the above Formula I preferably have the configuration of D-hexofuranoses, especially of D-glucofuranose, as well as of D-mannose, D-galactose or D-allose, but also of L-hexofuranoses, such as L-idose. Compounds of the above Formula I, in which $R_A$ stands for a hydrogen atom, are primarily those with the configuration of 6-desoxy-D-xylohexafuranoses. An optionally etherified hydroxy group in 1-position may have the α- or β-configuration, and the compounds according to this invention may be in the form of pure anomers or of anomer mixtures.

Especially valuable pharmacological properties of the above kind characterize the D-glucofuranose compounds of the formula

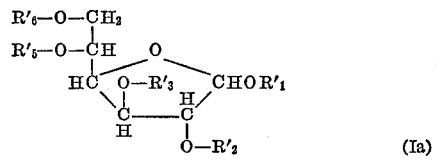

(Ia)

in which $R_1'$ represents a hydrogen atom or a lower alkyl radical, and $R_2'$ stands for a hydrogen atom or the acyl radical of an aliphatic carboxylic acid, especially a lower alkanemono- or -dicarboxylic acid, and in which each of the radicals $R_3'$ and $R_5'$ stands for a lower alkyl or lower alkenyl group or a benzyl group optionally substituted by lower alkyl, lower alkoxy or trifluoromethyl groups or halogen atoms, or a salicyloyl or an O-lower alkanoyl-, especially the O-acetyl-salicyloyl radical, $R_3'$ being also a hydrogen atom, and $R_6'$ stands for a lower alkyl or lower alkenyl group or a phenyl or benzyl group optionally substituted by lower alkyl, lower alkoxy or trifluoromethyl groups or halogen atoms, or a salicyloyl or an O-lower alkanoyl-, especially the O-acetyl-salicyloyl radical, with the proviso that at least one of the radicals $R_3'$, $R_5'$ and $R_6'$ stands for a salicyloyl or O-lower alkanoyl-, especially O-acetyl-salicyloyl radical, and at least one of the radicals $R_1'$, $R_3'$, $R_5'$ and $R_6'$ stands for one of the optionally substituted hydrocarbon radicals indicated for these groups.

Especially mentioned are the lower alkyl-2-O—$R_2''$-3-O—$R_3''$-5-O—$R_5''$-6-O—$R_6''$ - D - glucofuranosides, in which $R_2''$ represents hydrogen or a lower alkanoyl or carboxy-lower alkanoyl radical, one or two of the groups $R_3''$, $R_5''$ and $R_6''$ stand for the salicyloyl radical and each of the other groups represents a lower alkyl radical or a benzyl group optionally substituted, preferably in 4-position, by lower alkyl, for example, methyl groups, lower alkoxy, for example, methoxy groups, or halogen, for example, chlorine atoms, $R_3''$ also representing a hydrogen atom and $R_6''$ also representing a phenyl group optionally substituted, for example, in the same manner as the benzyl group.

From among this group, there may be mentioned primarily the n-butyl-3-O-n-propyl-5,6-di-O-salicyloyl-D-glucofuranoside and above all the ethyl-3-O-n-propyl-5,6-di-O-salicyloyl-D-glucofuranoside.

The compounds of the present invention can be manufactured according to per se conventional methods, for example, by converting in a monosaccharide which contains at least one free or reactive esterified saccharide-hydroxy group and in which further saccharide-hydroxy groups may be etherified by an optionally substituted hydrocarbon radical, and/or esterified by the acyl radical of an organic acid, and/or wherein two hydroxy groups may be jointly etherified by an optionally substituted ylidene hydrocarbon radical, the free or reactive esterified saccharide-hydroxy group into an optionally substituted 2-R—O-benzoyloxy radical, and splitting off in a resulting compound, in which two hydroxy groups are jointly etherified by an optionally substituted ylidene hydrocarbon radical, the ylidene hydrocarbon group and/or forming in a resulting compound, which does not contain at least one hydroxy group etherified by an optionally substituted hydrocarbon radical, such group, and if desired, converting a resulting compound within the scope of the definition into another compound and/or, if desired, converting a resulting salt into the free compound or into another salt, and/or, if desired, converting a resulting compound having a salt-forming group into a salt, and/or, if desired, resolving a resulting mixture of isomers into the individual isomers.

In a starting material, in which two hydroxy groups are etherified by a readily eliminable ylidene radical, such radical is primarily an unsubstituted or preferably mono- or disubstituted methylene group. Substituents of the latter are especially optionally substituted mono- or divalent aliphatic hydrocarbon radicals, preferably lower alkyl, for example, ethyl, n-propyl, isopropyl or n-butyl and especially methyl radicals, as well as lower alkylene radicals having 4–6 chain carbon atoms, such as 1,4-butylene or 1,5-pentylene radicals. These hydrocarbon radicals may contain substituents, for example, lower alkyl groups, hydroxy or lower alkoxy groups or halogen atoms, as well as aromatic groups, such as phenyl groups optionally substituted, for example, by lower alkyl, hydroxy or lower alkoxy groups or halogen atoms. Further substituents of the methylene group may be, for example, aromatic radicals, such as phenyl groups optionally substituted, for example, as indicated above, or free or functionally converted, for example, esterified carboxyl groups, for example, carbo-lower alkoxy, such as carbomethoxy or carbethoxy groups. Prefered ylidene groups are the isopropylidene group and the benzylidene group.

A free hydroxy group in the starting material can be converted into the desired 2-R—O-benzoyloxy group by per se conventional acylating methods, for example, by reacting an appropriate starting material with an optionally substituted 2-R—O-benzoic acid, preferably with a corresponding 2-hydroxybenzoic acid containing a protected, for example, acylated or etherified, 2-hydroxy group, or especially with a reactive derivative thereof. An acylated 2-hydroxy group is primarily a 2-hydroxy group esterified by an organic carboxylic acid, such as a lower alkanoyloxy, for example, aceyloxy group, or an aroyloxy, for example, benzoyloxy group. An etherified 2-hydroxy group is primarily a hydroxy group etherified with an optionally substituted aliphatic or araliphatic hydrocarbon radical, such as a lower alkoxy, for example methoxy group, or an optionally substituted phenyl-lower alkoxy, for example, benzyloxy group, the latter being easily split by hydrogenolysis.

A reactive derivative of the optionally substituted 2-R—O-benzoic acid, which is preferably used, is, for example, a corresponding halide, such as chloride, or an anhydride or a mixed anhydride, such as the anhydride with a lower alkyl half ester of carbonic acid (which can be obtained, for example, by reacting a suitable salt, such as an ammonium salt, of the acid with a halogenoformic acid lower alkyl ester, for example, ethyl chloroformate) or with a suitable, optionally substituted lower alkanecarboxylic acid, for example, trichloracetic acid or pivalic acid, furthermore an activated ester of such acid, for example, an ester with an N-hydroxyamino or N-hydroxyimino compound, such as N - hydroxy - succinimide, or with a lower alkanol, especially methanol, or a phenol containing electron-attracting groups, for example, nitro, acyl, such as lower alkanoyl, e.g. acetyl, or aroyl, e.g. benzoyl groups, or optionally functionally converted carboxy groups, such as carbo-lower alkoxy, for example, carbomethoxy or carbethoxy groups, carbamoyl, for example, N,N-dimethyl-carbamoyl groups, or cyano groups, for example, cyanomethanol or 4-nitrophenol.

If necessary, the reaction is performed in the presence of a suitable condensing agent; an acid can be used, for example, in the presence of dehydrating condensing agents, such as a carbodiimide, e.g. dicyclohexylcarbodiimide, if desired, together with a catalyst, such as a copper salt, e.g. copper-I- or copper-II-chloride, or a β-alkinylamine or lower alkoxyacetylene compound, whereas an acid halide is used, for example, in the presence of a basic, acid-binding condensing agent, such as pyridine or triethylamine, and an anhydride, for example, in the presence of a suitable carbodiimide and, if desired, of a catalyst, such as zinc chloride.

In a starting material containing a reactive esterified hydroxy group, such as a halogen, for example, bromine or iodine atom, or containing a hydroxy group esterified with a strong organic sulfonic acid, for example, a p-toluenesulfonyloxy group, such group can be converted into the desired, optionally substituted 2-R—O-benzoyl group, for example, by treatment with a salt of an optionally substituted 2-R—O-benzoic acid, such as an alkali metal, for example, sodium or potassium salt, or a silver salt.

The elimination of an ylidene radical which may be present in a compound resulting from the present process and etherifies two hydroxy groups, is generally performed by treatment with water or an alcohol in the presence of an acid.

As acid there is ordinarily used a Lewis acid, especially an inorganic acid, such as a mineral acid, for example, a hydrohalic, especially hydrochloric acid, as well as hydrobromic acid, furthermore sulfuric or phosphoric acid, or an organic acid, such as an organic carboxylic acid, for example, formic or oxalic acid, or an organic sulfonic acid, for example, p-toluenesulfonic acid, or a mixture of acids, for example, a mixture of hydrochloric acid or p-toluenesulfonic acid and acetic acid, preferably in the form of glacial acetic acid, furthermore a salt having Lewis acid character.

The above splitting reaction is preferably performed in the presence of a diluent; a reaction participant, inter alia an alcoholic reactant or an organic acid, such as acetic acid, may also function as diluent; a mixture of solvents and diluents may also be used. If an alcohol is used, the reaction is preferably performed in the presence of a hydrohalic acid, especially hydrochloric acid, and, in case water is used, in the presence of an organic carboxylic acid, especially formic or oxalic acid, particularly in the presence of acetic acid, the reaction being performed, if necessary, with cooling, but primarily at room temperature or at an elevated temperature (for example, at about 25° C. to about 150° C.), if necessary, in a closed vessel under pressure and/or in an inert gas atmosphere, for example, under nitrogen.

When in the above splitting reaction an alcohol is used as reagent in the presence of an anhydrous acid, especially hydrogen chloride, one of the two hydroxy groups etherified by the ylidene radical, especially that of a semi-acetal grouping, can upon its literation be etherified. The splitting reaction can thus be used simultaneously for the introduction of an etherified hydroxy group into a compound obtainable by the instant process which, for example, does not contain the required etherified hydoxy group.

In a resulting compound, which does not yet contain at least one hydroxy group etherified by an optionally substituted hydrocarbon radical, such group can be formed according to per se conventional methods, optionally after its liberation, for example, from an esterified hydroxy group or by splitting off an ylidene radical, and, if desired, after conversion into an esterified hydroxy group.

A hydroxy group can be liberated from an esterified hydroxy group, for example, by hydrolysis, preferably in the presence of a mild basic agent, such as an alkali metal hydrogen carbonate. When water in the presence of an acid is used for the elimination of the ylidene group, the two hydroxy groups etherified by such group are obtained in the free form.

The etherification of a free hydroxy group can be performed, for example, by treatment with a reactive ester of a hydroxy compound, such as an alcohol, for example, with a corresponding halide, such as chloride or bromide, or a corresponding organic sulfonyloxy compound, such as a p-toluenesulfonyloxy compound, in the presence of a basic agent, such as an alkali metal hydroxide, for example, sodium hydroxide or potassium hydroxide, an alkali metal carbonate, for example, sodium or potassium carbonate, or silver oxide.

In a compound with the free hydroxy group of a semi-acetal grouping (which hydroxy group is preferably liberated through the elimination of an ylidene radical), such hydroxy group can also be etherified by treating a corresponding compound with an alcohol in the presence of an acid. The latter may be a Lewis acid, such as a mineral acid, for example, hydrochloric acid, or an organic carboxylic acid, for example, acetic acid, or a sulfonic acid, for example, p-toluenesulfonic acid, if desired, a mixture of acids, such as acetic acid in admixture with hydrochloric acid or p-toluenesulfonic acid, furthermore salts with Lewis acid character, the reaction being performed preferably at a mineral acid concentration of about 0.05 N to about 1 N, primarily of about 0.1 N to about 0.5 N.

An esterified hydroxy group suitable for the etherification is, for example, an acyloxy group, in which acyl represents the corresponding radical of an organic carboxylic acid, such as a lower alkanecarboxylic, for example, acetic acid, or an aromatic carboxylic acid, for example, benzoic acid. An esterified hydroxy group is preferably a reactive esterified hydroxy group, primarily a hydroxy group esterified by a hydrohalic acid. Such esterified hydroxy group, which may belong in particular to a semi-acetal grouping, is, therefore, above all a lower alkanoyloxy radical or a halogen atom, especially a bromine atom. A reactive esterified hydroxy group of a semi-acetal grouping, such as an acyloxy group or a halogen atom, can be introduced, for example, by treatment of a compound containing a free semi-acetal hydroxy group with a suitable derivative of an organic carboxylic acid, such as acetic acid, for example, an anhydride, such as acetic acid anhydride, and, if desired, by reaction of the resulting acyl compound with halogen, for example, bromine in glacial acetic acid.

The conversion of an esterified hydroxy group into an etherified hydroxy group is preferably performed by treatment of the starting material with an alcohol. The reaction of a starting material with an acyloxy group is preferably performed in the presence of an acid, especially a mineral acid, such as hydrohalic acid, for example, hydrochloric acid, that of a starting material with a reactive esterified hydroxy group in the presence of a suitable acid binding agent, for example, a silver, lead or mercury salt or a corresponding oxide, or a tertiary base, it being possible also to use a metal derivative of the alcohol, such as the corresponding alkali metal, for example, sodium or potassium, alkaline earth metal, for example, magnesium, or silver compounds.

The above reaction is preferably performed in the presence of a solvent, it being possible to use an alcoholic reagent also as such solvent.

A compound obtainable by the process of this invention can be converted into other compounds in known manner. Thus, is it possible under suitable conditions to convert a compound having a certain monosaccharide form into a compound having a different monosaccharide form; for example a glucofuranoside with a free hydroxy group in 5-position can, upon treatment with a suitable acid, for example, one of the aforementioned Lewis acids, such as hydrochloric acid, be converted into the corresponding glucopyranoside.

Furthermore, a hydroxy group can be converted into an etherified hydroxy group, for example, the one of a hemiacetal grouping as described above, and a phenolic hydroxy group, e.g. by treatment with a reactive ester of an alcohol, preferably in the presence of a salt-forming reagent, or with a diazo compound. Moreover, the etherified hydroxy group in a semi-acetal grouping can be liberated, for example, by treatment with an acid in an aqueous medium. Suitable acids include broadly the aforementioned Lewis acids, such as mineral acids, for example, hydrochloric acid, or sulfonic, for example, p-toluenesulfonic acids, also mixtures of such acids, such as acetic acid in admixture with hydrochloric acid or p-toluenesulfonic acid, as well as salts with Lewis acid character. Especially advantageous are aqueous acetic acid, for example, aqueous acetic acid of more than about 40%, especially of about 50% to about 70% strength, as well as aqueous mixtures of acids, such as acetic and sulfuric acid. The reaction can be performed in a heterogeneous or homogeneous phase, and it can be accelerated by the addition of a catalyst, such as a catalytic quantity of phosphoric acid.

In a resulting compound with a hydrogenolytically splittable hydroxy group, above all a hydroxy group which is etherified by an optionally substituted benzyl radical, including a corresponding group R—O- in the 2-R—O-benzoyl radical, such group can be converted into a hydroxy group, for example, by treatment with catalytically activated hydrogen, such as hydrogen in the presence of a noble metal catalyst, for example, a palladium catalyst.

In a compound of this invention, an unsaturated, for example, lower aliphatic hydrocarbon radical, such as a lower alkenyl, for example, allyl radical, can be saturated by treatment with a suitable reducing agent, such as catalytically activated hydrogen, for example, hydrogen in the presence of a palladium catalyst.

An esterified hydroxy group in a resulting compound can be converted into a free hydroxy group, for example, by hydrolysis or by alcoholysis. Thus, for example, an acylated hydroxy group R—O— in a 2-R—O-benzoyl radical can be converted into the free hydroxy group by treatment with an alcohol, such as a lower alkanol, in the presence of an acid, for example, a mineral acid, such as hydrochloric acid, under mild conditions or by treatment with a mild basic agent, such as an alkali metal hydrogen carbonate. In this connection, the liberation of the hydroxy group from a suitable 2-acyloxy-benzoyl radical may also take place, if desired, during the elimination of an ylidine radical, for example, simultaneously with the treatment of a corresponding compound with an alcohol in the presence of an acid.

In a resulting compound, which contains a free hydroxy group, this group can be esterified by treatment with an acylating agent introducing the acyl radical of an organic carboxylic acid in per se conventional manner. Suitable acylating agents are acid derivatives (in the case of dicarboxylic acids, for example, their monoacid derivatives), especially anhydrides (also inner anhydrides, such as corresponding ketenes), as well as halides, especially chlorides. A preferred procedure is the reaction with anhydrides, such as, for example, succinic acid anhydride, in the presence of acid or basic catalysts, for example, pyridine. The reaction with carboxylic acid halides, for example, chlorides, such as succinic acid monochloride, can be performed in the presence of acid-binding condensing agents, such as tertiary bases or sodium acetate. It is also possible to esterify a free hydroxy group by means of carboxylic acids in the presence of suitable condensing agents, such as dicyclohexylcarbodiimide or of reactive esters of carboxylic acids, such as esters with N-hydroxyamino or N-hydroxyimino compounds, for example, N-hydroxysuccinimide.

Depending on the reaction conditions, compounds containing a radical having salt-forming groups, such as, for example, free carboxy groups, can be obtained in free form or in the form of salts, which forms can be converted into each other in a known manner. Salts of compounds having free carboxyl groups are, for example, metal salts, especially alkali metal salts, for example, sodium or potassium salts, as well as alkaline earth metal salts, for example, magnesium or calcium salts, or ammonium salts, for example, those with ammonia or organic bases, such as tri-lower alkylamines, for example, trimethylamine or triethylamine, especially the pharmaceutically acceptable, non-toxic salts of the above kind. They are obtained, for example, by treatment of the free compounds with metal hydroxides or carbonates or with ammonia or amines, or with suitable ion exchangers.

Compounds with basic groups may be in the form of acid addition salts, especially pharmaceutically acceptable, non-toxic salts, for example, with inorganic acids, such as hydrochloric, hydrobromic, sulfuric or phosphoric acid, or with organic acids, such as aliphatic, cycloaliphatic, cycloaliphatic-aliphatic, aromatic, araliphatic, heterocyclic or heterocyclic-aliphatic carboxylic or sulfonic acids, for example, acetic, propionic, succinic, glycollic, lactic, malic, tartaric, citric, ascorbic, maleic, phenyl acetic, benzoic, 4-aminobenzoic, anthranilic, 4-hydroxybenzoic, salicylic, aminosalicylic, embonic or nicotinic acids, as well as methanesulfonic, ethanesulfonic, p-methylphenylsulfonic, naphthalenesulfonic, sulfanilic or cyclohexylsulfamic acid. Salts of this kind can be obtained, for example, by treatment of free compounds containing basic groups with the acids or with suitable anion exchangers.

In view of the close relationship between the new compounds in the free form and in the form of their salts, what has been said above and hereinafter with reference to a free compound refers similarly to the corresponding salt provided such is possible or appropriate under the circumstances.

The new compounds can be pure α- or β-anomers or anomer mixtures. The latter can be resolved into the pure anomers in known manner by virtue of the physicochemical differences in their constituents, for example, by means of chromatography, such as thin-layer chromatography, or any other suitable separation procedure. Preferably the more active of the two anomers is isolated.

The aforedescribed processes are carried out in known manner in the absence or preferably in the presence of diluents or solvents, if necessary, with cooling or heating, under increased pressure and/or in an inert gas atmosphere, for example, a nitrogen atmosphere.

The invention also concerns those modifications of the process, in which an intermediate product obtainable at any stage of the complete process is used as starting material and the remaining step(s) is(are) carried out or wherein a starting material is formed under the reaction conditions or is used in the form of a reactive derivative thereof.

Those starting materials are preferred which lead to compounds indicated above as being particularly valuable. The compounds of the Formula I designated above as being particularly valuable can therefore be prepared in per se conventional manner by converting in a hexofuranose compound of the formula

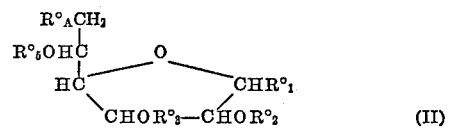

(II)

in which $R_1°$ represents an optionally substituted aliphatic, cycloaliphatic, cycloaliphatic-aliphatic or araliphatic hydrocarbon radical, $R_2°$ stands for hydrogen or preferably for one of the aforementioned radicals differing from hydrogen, or in which $R_1°$ and $R_2°$ together represent an optionally substituted methylene group —X—, and in which at least one of the radicals $R_3°$, $R_4°$ and $R_A°$ stands for a free or reactive esterified hydroxy group, and the others have the meanings of $R_3$, $R_5$ or $R_A$, the free or reactive esterified hydroxy group into an optionally substituted 2-R—O-benzoyloxy radical, and reacting a resulting compound, in which $R_1°$ and $R_2°$ together stand for an optionally substituted methylene group —X—, with a compound of the formula $R_1$—OH in the presence of an acid, and introducing into a resulting compound, in which none of the residues $R_1$, $R_2$, $R_3$, $R_5$ and $R_6$ represents one of the optionally substituted hydrocarbon residues mentioned above, such residue, and if desired, reacting a resulting compound, in which $R_1$ represents a hydrogen atom, with an alcohol of the formula $R_1$—OH in the presence of an acid, or converting in a resulting compound, in which $R_1$ represents a hydrogen atom and $R_2$ preferably stands for an acyl radical, the free hydroxy group in 1-position into an esterified hydroxy group and treating the resulting ester with an alcohol of the formula $R_1$—OH, and/or, if desired, reacting a resulting compound, in which $R_1$ represents an organic radical, with an acid in the presence of water, and/or, if desired, splitting in a resulting compounds, in which the group of the formula —$OR_1$ represents a hydrogenolytically splittable radical, this radical by hydrogenolysis, and/or, if desired, saturating in a resulting compound an unsaturated hydrocarbon radical of aliphatic or cycloaliphatic character, and/or, if desired or required, converting in a resulting compound an esterified hydroxy group into a free hydroxy group or into a different esterified hydroxy group and/or converting a free hydroxy group into a hydroxy group esterified by an organic acid, and/or, if desired, converting a resulting salt into the free compound or into a different salt, and/or, if desired, converting a resulting compound with a salt-forming group into a salt, and/or, if desired, separating a resulting isomer mixture into the individual isomers. The various process steps are performed in accordance with the methods described above.

The starting materials are known, or, if new, represent another embodiment of the present invention. The preparation of the starting materials is described below in greater detail using as an example the preparation of the starting materials for the preferred hexofuranose compounds of the Formula I. It is possible, for example, to shield in a hexofuranose the hydroxy groups in positions 1 and 2, and, if desired, in positions 5 and 6, by the introduction of protective groups, for example, of a group —X—, which stands primarily for an isopropylidene, but also for a benzylidene group. The hydroxy group in 3-position can then be etherified by treatment with a reactive ester of an alcohol of the formula $R_3$—OH, such as, for example, a lower aliphatic $R_3$-halide, for example, $R_3$-chloride or $R_3$-bromide, as well as a corresponding $R_3$-sulfonyloxy compound, in the presence of a basic agent, such as an alkali metal hydroxide, for example, sodium hydroxide or potassium hydroxide, or an alkali metal carbonate, for example, sodium or potassium carbonate, or esterified according to the previously described procedure. Etherification of the 3-hydroxy group can also be carried out under suitable conditions, for example, in the presence of silver oxide or an alkali metal carbonate, for example, potassium carbonate, in a 3,5-dihydroxy or 3,5,6-trihydroxy compound, without the hydroxy groups in positions 5 and 6 being etherified too.

In a resulting intermediate product, which has protected hydroxy groups in positions 5 and 6, these groups can be selectively liberated, that is to say, without the liberation of the hydroxy groups in positions 1 and 2, for example, by treatment with an acid, such as 60% aqueous acetic acid (for example, at 35° C.) or aqueous ethanolic hydrochloric acid, and then in turn be etherified or esterified in the indicated maner. This can also be carried out step-wise in that a primary hydroxy group in 6-position can be etherified or esterified prior to that in 5-position, for example, by treatment with an about equivalent quantity of reactive ester of the compound of the formula $R_6$—OH in the presence of an about equivalent quantity of an alkali metal hydroxide or of silver oxide and in the presence of a suitable acid or a reactive derivative thereof, respectively.

It is also possible in a 5,6-dihydroxy compound, which in 3-position contains an etherified or esterified hydroxy group, to esterify selectively the 6-hydroxy group, for example, by treatment with a suitable organic sulfonic acid halide, such as p-toluenesulfonyl chloride, and to form the 5,6-epoxy compound by treatment with a suitable basic agent, such as an alkali metal lower alkoxide, e.g. sodium ethoxide; by splitting the epoxide on treatment with a compound of the formula $R_6$—OH in the presence of a transesterification catalyst, for example, an alkali metal alcoholate, such as sodium alcoholate, or a suitable base, such as pyridine, or with an acid, a 5-hydroxy compound with an etherified or esterified hydroxy group in 6-position is obtained. The 5-positioned free hydroxy group in the latter can be selectively etherified, for example, in the manner described above.

In a similar manner there can be obtained 6-desoxy-starting materials of the Formula I, in which $R_A$ stands for hydrogen. Suitable intermediate compounds are obtained from corresponding compounds having a side chain of the formula

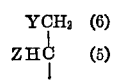

in 4-position, in which Y represents a reductively elimable group, such as a reactive esterified hydroxy group, for example, an organic sulfonyloxy group, such as the p-toluenesulfonyloxy group, or a holgen atom, for example, the iodine atom, and Z stands for a free, etherified or esterified hydroxy group, or wherein Y and Z together represent an oxido group. A group Y, which can be split off by reduction can be replaced by hydrogen, for example, by treatment with a hydride reducing agent, such as lithium aluminum hydride, and a halogen atom, especially an iodine atom Y by treatment with catalytically activated hydrogen, such as hydrogen in the presence of a palladium catalyst. An oxido group formed by the radicals Y and Z can be split up by treatment either with a hydride reducing agent or with catalytically activated hydrogen; there is obtained in this manner the desired 6-desoxy compound with a free hydroxy group in 5-position.

A hexafuranoside suitable as starting material, which contains, for example, a free hydroxy group in 6-position, an etherified hydroxy group in 3-position, and an etherified or esterified hydroxy group in 5-position can be formed, for example, by temporarily protecting selectively in a 1,2-acetalized or -ketalized D-glucofuranose having an etherified hydroxy group in 3-position, the free hydroxy group in 6-position by the introduction of the trityl group (for example, by treatment with trityl chloride in the presence of pyridine) or esterification with an organic sulfonic acid, and etherifying the hydroxy group in 5-position by treatment with a reactive ester of an alcohol of the formula $R_5$—OH in the presence of a basic agent, such as silver oxide, or esterifying it by treatment with an acid or a reactive derivative thereof, then liberating the hydroxy group in 6-position, optionally together with the hydroxy groups in 1- and 2-position, for example, by treatment with an acid, such as hydrochloric acid, or selectively, for example, by treatment for a short period with a suitable acid.

It is possible at any desired stage of the aforedescribed process for the manufacture of the starting materials to liberate a hydroxy group etherified by a suitable 2-alkenyl, such as the allyl radical, for example, by rearrangement of the double bond by treatment with a suitable base, such as an alkali metal, for example, potassium tertiary butyloxide, preferably in a suitable solvent, for example, dimethylsulfoxide, and by oxidative-hydrolytic removal of the resulting 1-lower alkenyl group, such as the 1-propenyl group, for example, by treatment with potassium permanganate, preferably in a basic medium, such as an ethanolic alkali metal hydroxide, for example, potassium hydroxide, and, if desired, to etherify or esterify the free hydroxy group according to the previously described procedure. The reactions described above may in analogy be applied for the manufacture of starting materials other than hexofuranose compounds.

The pharmacologically active compounds of the present invention are useful in the manufacture of pharmaceutical compositions, containing an effective amount thereof in conjunction or admixture with inorganic or organic, solid or liquid excipients suitable for enteral or parenteral application. Preferred are tablets and gelatin capsules comprising the active ingredient together with diluents, e.g. lactose, dextrose, sucrose, mannitol, sorbitol, cellulose and/or glycine, and lubricants, e.g. silica, talcum, stearic acid or salts thereof, such as magnesium or calcium salts thereof, and/or polyethyleneglycol; tablets also contain binders, e.g. magnesium aluminum silicate, starches, e.g. corn, wheat or rice starch or arrow root, gelatin, tragacanth, methylcellulose, sodium carboxymethylcellulose and/or polyvinylpyrrolidone, and, if desired, disintegrants, e.g. starches, agar, alginic acid or a salt, such as the sodium salt, thereof, and/or efferverscent mixtures and adsorbents, colorants, flavors and/or sweeteners. Injectable compositions are preferably aqueous isotonic solutions or suspensions, suppositories advantageously fatty emulsions or suspensions. They may be sterilized and/or contain auxiliary substances, such as preserving, stabilizing, wetting and/or emulsifying agents, solubilizers, salts for regulating the osmotic pressure and/or buffers. The pharmaceutical preparations, which in addition may include other therapeutically valuable substances, are prepared according to known methods, e.g. conventional mixing, granulating or coating methods and contain from about 0.1 to about 75%, preferably from about 1 to about 50% of the active ingredient.

The definition lower used in this context in connection with organic residues or compounds denotes such residues and compounds as having preferably up to 7, primarily up to 4 carbon atoms.

The following examples are intended to illustrate the invention; temperatures are given in degrees centigrade.

EXAMPLE 1

A solution of 56 g. of 1,2-O-isopropylidene-3-O-n-propyl-5-O-(4-chloro-benzyl) - 6 - O-(O-acetyl-salicyloyl)-α-D-glucofuranose in 1200 ml. of a 1 N solution of hydrogen chloride in ethanol is left to stand for 16 hours at room temperature and is then cooled to 0–5° and neutralized with a 10 N aqueous sodium hydroxide solution. The bulk of the ethanol is distilled off under reduced pressure and the residue is extracted with diethyl ether. The ether extract is washed with a saturated aqueous sodium hydrogen sulphite solution and with water, dried over sodium sulfate and evaporated under reduced pressure. The residue, degassed under a high vacuum, consists of pure ethyl-3-O-n-propyl-5-O-(4-chloro-benzyl)-6-O-salicyloyl-D-glucofuranoside of formula

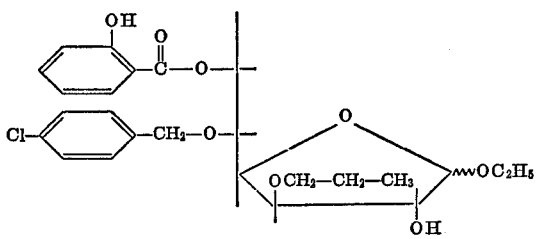

in the form of a yellowish oil, $[\alpha]_D^{20} = -13° \pm 1°$ (c.=1.267 in chloroform).

The starting material can, for example, be manufactured as follows:

A solution of 82 g. of 1,2-O-isopropylidene-3-O-allyl-α-D-glucofuranose in 800 ml. of ethanol is hydrogenated in the presence of 1 g. of a 10% strength palladium-on-charcoal catalyst. The catalyst is filtered off, the filtrate is evaporated and the residue is degassed in a high vacuum, and the 1,2-O-isopropylidene-3-O-n-propyl-α-D-glucofuranose is thus obtained; $[\alpha]_D^{20} = -49° \pm 1°$ (c.=1 in chloroform).

A solution of 206 g. of 1,2-O-isopropylidene-3-O-n-propyl-α-D-glucofuranose in 500 ml. of absolute pyridine is mixed with a solution of 240 g. of trityl chloride in 800 ml. of absolute pyridine; the reaction mixture is left to stand for 3 days and the precipitate is then filtered off. The filtrate is mixed with water until it turns slightly cloudy and, after standing for 15 minutes, is poured out into 8000 ml. of ice-water. The supernatant liquid is decanted from the gummy residue; the latter is stirred with 3 further portions of 2000 ml. each of ice-water and is then taken up in 1500 ml. of chloroform. The chloroform solution is washed with 10% aqueous acetic acid, a saturated aqueous sodium hydrogen carbonate solution and with water until neutral, dried over sodium sulfate and evaporated under reduced pressure, and the residue is degassed in a high vacuum. The residue contains the 1,2-O - isopropylidene-3-O-n-propyl-6-O-trityl-α-D-glucofuranose, which is identified as the 1,2-O-isopropylidene-3-O-n-propyl-5-O-acetyl-6-O-trityl - α - D-glucofuranose; M.P. 175–176°; $[\alpha]_D^{20} = -41° \pm 1°$ (c.=1 in chloroform); which is obtained on treating a pyridine solution of the 1,2-O-isopropylidene-3-O-n-propyl-6-O-trityl-α-D-glucofuranose with acetic acid anhydride.

A solution of 280 g. of 1,2-O-isopropylidene-3-O-propyl-6-O-trityl-α-D-glucofuranose in 400 ml. of dimethylsulfoxide is added dropwise to a suspension of 51 g. of powdered potassium hydroxide in 150 ml. of dimethylformamide and the reaction mixture is warmed to 55–60° and treated dropwise over the course of 5 hours with a mixture of 130 g. of 4-chloro-benzyl chloride and 20 ml. of dimethylsulfoxide. After cooling, the mixture is poured into 500 ml. of ice-water and extracted with chloroform. The organic phase is washed with water until neutral and evaporated under reduced pressure after drying over sodium sulfate. The 1,2-O-isopropylidene-3-O-n-propyl-5-O-(4-chloro-benzyl)-6-O-trityl - α - D-glucofuranose is thus obtained and is further processed without purification.

A solution of 10 g. of 1,2-O-isopropylidene-3-O-n-propyl-5-O-(4-chloro-benzyl)-6-O-trityl-α-D-glucofuranose in 100 ml. of glacial acetic acid is mixed at room temperature with 20 ml. of 1 N hydrochloric acid; the mixture is cooled to 0° and the trityl alcohol which has crystallized out is filtered off. The filtrate is mixed with 200 ml. of water and extracted with diethyl ether. The organic extract is washed with a saturated sodium hydrogen carbonate solution and with water until neutral, dried and evaporated under reduced pressure at 40°. The residue is dissolved in chloroform and the solution is chromatographed on a silica gel column, the trityl alcohol being eluted as the first fraction. The 1,2-O-isopropylidene-3-O-n-propyl-5-O-(4-chloro-benzyl) - α - D-glucofuranose is eluted with methanol; the solution is evaporated under reduced pressure and the residue is distilled under a high vacuum, the product, a colorless oil, being obtained at 190°/0.1 mm. Hg.

A solution of 40 g. of 1,2-O-isopropylidene-3-O-n-propyl - 5 -O - (4 - chloro-benzyl)-α-D-glucofuranose in 104 ml. of pyridine, cooled to 0–5°, is mixed with a solution of 41.25 g. of O-acetyl-salicylic acid chloride in 156 ml. of chloroform and the mixture is left to stand for 16 hours at room temperature. The reaction mixture is treated with 20 ml. of water and stirred for 2 hours at 20°. After distilling off the bulk of the solvent under reduced pressure, the residue is extracted with diethyl ether. The ether solution is washed with ice-cold 2 N sulfuric acid, a saturated aqueous sodium hydrogen carbonate solution and with water, in this sequence, and is dried over sodium sulfate. After evaporation of the ether solution, the pure 1,2-O-isopropylidene-3-O-n-propyl-5-O-(4-chloro-benzyl) - 6 - O - (O - acetyl-salicyloyl)-α-D-glucofuranose is obtained as the residue in the form of a yellow viscous oil, $[\alpha]_D^{20} = -18° \pm 1°$ (c.=0.926 in chloroform); thin layer chromatogram (silica gel RF 254 of Messrs. Merck, Darmstadt; system: chloroform ethyl acetate 85:15): $Rf$=0.60.

EXAMPLE 2

A solution of 99.2 g. of 1,2-O-isopropylidene-3-O-n-propyl - 5,6 - di - O - (O-acetyl-salicyloyl)-α-D-glucofuranose in 1200 ml. of a 1 N solution of hydrogen chloride in ethanol is left to stand for 15 hours at room temperature. The reaction mixture is then concentrated to one-third of its volume under reduced pressure and at a temperature of 40° and, after cooling to 0–5°, is neutralized with a saturated aqueous sodium hydrogen carbonate solution. The bulk of the ethanol is distilled off under reduced pressure and the resulting residue is extracted with diethyl ether. The ether solution is washed with an aqueous sodium hydrogen sulphite solution and with water, dried over sodium sulfate and evaporated under reduced pressure. The residue, in an 85:15 mixture of chloroform and ethyl acetate, is adsorbed on a chromatography column using silica gel (Kieselgel H according to Stahl, of Messrs. Merck, Darmstadt) and eluted with the same solvent. The pure ethyl-3-O-n-propyl-5,6-di-O-salicyloyl-D-glucofuranoside of formula

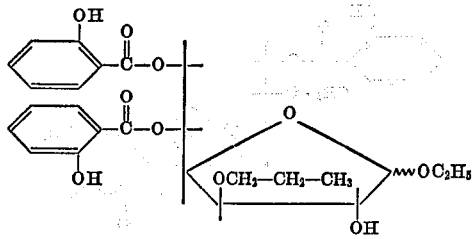

is thus obtained as a yellowish oil, $[\alpha]_D^{20} = -43° \pm 1°$ (c.=1.339 in chloroform). The resulting anomer mixture can be separated into the individual anomers by thin layer chromatography (silica gel R$_f$ 254 of Messrs. Merck, Darmstadt; system: chloroform-ethyl acetate 85:15); the α-anomer shows an R$_f$-value of 0.63 and the β-anomer an R$_f$-value of 0.33.

The starting material can be obtained as follows:

A solution of 140 g. of O-acetyl-salicylic acid chloride in 630 ml. of chloroform is treated at 0-5° with a solution of 46 g. of 1,2-O-isopropylidene-3-O-n-propyl-α-D-glucofuranose in 420 ml. of pyridine and allowed to stand for 16 hours at room temperature. The reaction mixture is treated with 100 ml. of water and stirred for 1 hour at room temperature. After distilling off the bulk of the solvent under reduced pressure, the residue is extracted with diethyl ether. The ether solution is washed three times with each of ice-cold 2 N sulfuric acid, a saturated aqueous sodium hydrogen carbonate solution and water, in this sequence, and is dried over sodium sulfate. After evaporation, the pure 1,2-O-isopropylidene-3-O-n-propyl-5,6-di-O-(O-acetyl-salicyloyl)-α-D - glucofuranose is obtained as a viscous oil which in a thin layer chromatogram (silica gel R$_f$ 254 of Messrs. Merck, Darmstadt; system: chloroform ethyl acetate 85:15) shows an R$_f$-value of 0.50.

EXAMPLE 3

A solution of 22.0 g. of 1,2-O-isopropylidene-3-O-benzyl-5-O-salicyloyl-6-desoxy-β-L-idofuranose in 400 ml. of a 1 N solution of hydrogen chloride in ethanol is allowed to stand at room temperature for 16 hours, then freed from the bulk of the solvent and of the hydrogen chloride under reduced pressure at a temperature of 40°. The residue is cooled to 0-5°, then neutralized with a saturated aqueous solution of sodium hydrogen carbonate, and extracted with diethyl ether. The organic extract is washed with a saturated aqueous sodium hydrogen carbonate solution and with water, dried over sodium sulfate, and evaporated under reduced pressure. The residue is chromatographed on silica gel (0.05-0.2 mm. grain size; column); with an 85:15-mixture of chloroform and ethyl acetate, the pure ethyl-3-O-benzyl-5-O-salicycloyl-6-desoxy-L-idofuranoside of the formula

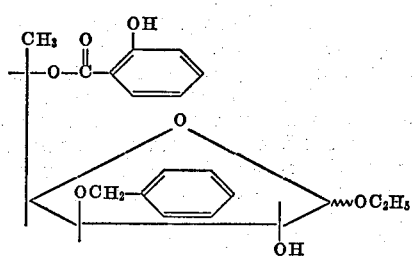

is obtained in the form of a yellow oil; $[\alpha]_D^{20} = +65° \pm 1°$ (c.=1 in chloroform).

The mixture of the α-and β-anomer can be resolved, for example, by thin-layer chromatography (silica gel; system chloroform/ethyl acetate 85:15); the α-anomer exhibits an R$_f$-value of 0.53; $[\alpha]_D^{20} = +79° \pm 1°$ (c.=1 in chloroform); and the β-anomer an R$_f$-value of 0.27; $[\alpha]_D^{20} = -17° \pm 1°$ c.=1 in chloroform).

The starting material can be prepared as follows:

A solution, heated at 55°, of 23.0 g. of 1,2-O-isopropylidene - 3 - O - benzyl-6-desoxy-β-L-idofuranose in 70 ml. of pyridine and 35 ml. of methylene chloride is mixed within a period of 1½ hours with a solution of 24.1 g. of 2-benzyloxy-benzoyl chloride in 35 ml. of methylene chloride while being stirred. The reaction is allowed to proceed for another 30 minutes, and the mixture is then treated with 20 ml. of water; the bulk of the methylene chloride and of the pyridine is then evaporated under reduced pressure. The residue is extracted with diethyl ether; the organic extract is washed with ice-cold 2 N hydrochloric acid, water, a saturated aqueous sodium hydrogen carbonate solution, and again with water, dried over sodium sulfate and evaporated under reduced pressure. The residue is degassed in a high vacuum (0.01 mm. Hg) and represents the 1,2-O-isopropylidene-3-O-benzyl-5-O-(2-benzyloxy - benzoyl) - 3 - desoxy - β- L-idofuranose; $[\alpha]_D^{20} = -2° \pm 1°$ (c.=1 in chloroform). The substance can be microdistilled; B.P. 220°/0.007 mm. Hg.

A solution of 30.0 g. of 1,2-O-isopropylidene-3-O-benzyl - 5 - O - (2-benzyloxy-benzoyl)-6-desoxy-β-L-idofuranose in 300 ml. of tetrahydrofuran is hydrogenated in the presence of 3.0 g. of a palladium-on-carbon catalyst (10%) at 50° under atmospheric pressure until 1335 ml. of hydrogen have been absorbed. The catalyst is filtered off and the tetrahydrofuran is distilled off under reduced pressure. The residue is dissolved in diethyl ether and the solution is washed with a saturated aqueous sodium hydrogen carbonate solution and with water, dried over sodium sulfate and evaporated under reduced pressure. On degassing under a high vacuum (0.01 mm. Hg), the 1,2 - O - isopropylidene - 3 - O - benzyl-5-O-salicyloyl-6-desoxy-β-L-idofuranose is obtained as a colorless oil, $[\alpha]_D^{20} = -280° \pm 0.5°$ (c.=1.62 in chloroform); microdistillation yields a colorless oil, B.P. 240°/0.01 mm. Hg.

EXAMPLE 4

A solution of 0.9 g. of 1,2-O-isopropylidene-5-O-salicyloyl-6-desoxy-β-L-idofuranose in 40 ml. of a 1 N solution of hydrogen chloride in ethanol is allowed to stand at room temperature for 20 hours, then freed from the solvent and from the hydrogen chloride under reduced pressure. The residue is dissolved in diethyl ether, and the solution is washed with a saturated aqueous sodium hydrogen carbonate solution and water, dried over sodium sulfate and evaporated. The residue is purified by thin-layer chromatography, using an 85:15-mixture of chloroform and ethyl acetate as mobile phase. The pure ethyl-5-O-salicyloyl-6-desoxy-L-idofuranoside of the formula

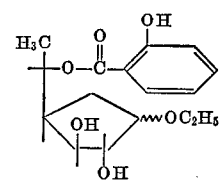

is obtained as a colorless oil; $[\alpha]_D^{20} = +22° \pm 1°$ (c.=0.71 in chloroform).

The starting material can be prepared as follows:

A solution of 12.1 g. of 1,2-O-isopropylidene-3-O-benzyl - 5 - O - (2 - benzyloxy-benzoyl)-6-desoxy-β-L-idofuranose in 120 ml. of tetrahydrofuran and 10 ml. of glacial acetic acid is hydrogenated in the presence of 2 g. of a palladium-on-carbon catalyst (10%) at 50° under atmospheric pressure until 1004 ml. of hydrogen have been absorbed. The catalyst is filtered off, and the tetrahydrofuran and the glacial acetic acid are distilled off under reduced pressure. The residue is dissolved in diethyl ether and the solution is washed with a saturated aqueous sodium hydrogen carbonate solution and water, dried over sodium sulfate, and evaporated under reduced pressure. The residue is crystallized from a mixture of diethyl ether and petroleum ether, and the pure 1,2-O-isopropylidene-5-O-salicyloyl-6-desoxy-β-L-idofuranose is obtained in the form of white crystals, M.P. 140–141°; $[\alpha]_D^{20} = -43° \pm 1°$ (c.=0.9 in chloroform).

EXAMPLE 5

A solution of 2.0 g. of ethyl-3-O-n-propyl-5,6-di-O-salicyloyl-D-glucofuranoside in 10 ml. of absolute pyridine and 10 ml. of acetic acid anhydride is kept at 80° for 2 hours. The bulk of the pyridine and of the acetic anhydride is then evaporated off under reduced pressure, and the residue is distilled under a high vacuum. In this manner the pure ethyl-2-O-acetyl-3-O-n-propyl-5,6-di-O-(2-acetyloxy-benzoyl)-D-glucofuranoside of the formula

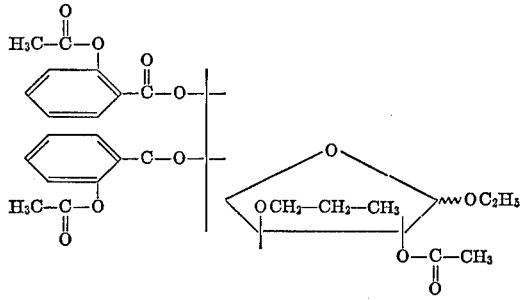

is obtained as a yellowish oil, B.P. 220–225°/0.01 mm. Hg; $[\alpha]_D^{20} = +23° \pm 1°$ (c.=1.2 in chloroform).

EXAMPLE 6

In an atmosphere of nitrogen, a solution of 2.66 g. of 2-benzyloxy-benzoylchloride in 10 ml. of methylene chloride is added dropwise in the course of 2 hours to a solution, having a temperature of 50–55°, of 2.0 g. of ethyl-2-O-acetyl-3,5-di-O-methyl-D-glucofuranoside in 20 ml. of absolute pyridine and 10 ml. of methylene chloride while stirring. The reaction is allowed to proceed for another 30 minutes at the same temperature. The bulk of the methylene chloride and of the pyridine is distilled off, and the residue is dissolved in diethyl ether. The solution is washed with ice-cold 2 N hydrochloric acid, a saturated aqueous sodium hydrogen carbonate solution and with water, dried over sodium sulfate, and evaporated under reduced pressure. The residue is the crude ethyl - 2 - O-acetyl-3,5-di-O-methyl-6-O-(2-benzoyloxy-benzoyl)-D-glucofuranoside of the formula

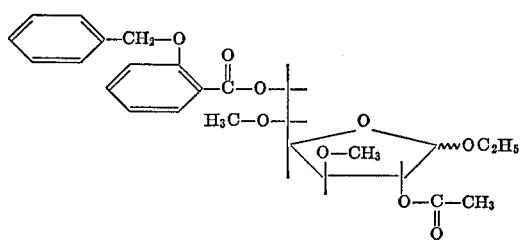

which can be used without purification for the manufacture of the ethyl-2-O-acetyl-3,5-di-O-methyl-6-O-salicyloyl-D-glucofuranoside.

EXAMPLE 7

A solution of 3.0 g. of ethyl-2-O-acetyl-3,5-di-O-methyl-6-O-(2-benzyloxy-benzoyl)-D-glucofuranoside in 30 ml. of 96% ethanol is hydrogenated in the presence of 0.3 g. of a palladium-on-carbon catalyst (10%) at 20° under atmospheric pressure until 209 ml. of hydrogen have been absorbed. The catalyst is filtered off, and the ethanol is distilled off under reduced pressure. The residue is dissolved in diethyl ether, and the solution is washed with an ice-cold, saturated aqueous sodium hydrogen carbonate solution and with ice-water, dried over sodium sulfate, and evaporated under reduced pressure. Distillation of the residue in a high vacuum yields the pure ethyl-2-O-acetyl - 3,5-di-O-methyl-6-O-salicyloyl-D-glucofuranoside of the formula

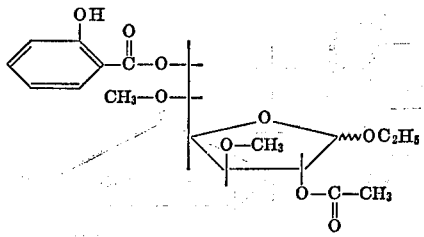

as a colorless oil, B.P. 170–/0.008 mm. Hg; $[\alpha]_D^{20} = +18 \pm 1°$ (c.=1.2 in chloroform).

The starting material can be prepared as follows:

In an atmosphere of nitrogen, 52.0 g. of powdered potassium hydroxide are stirred into a solution of 30.0 g. of 1,2-O-isopropylidene-6-O-benzyl-α-D-glucofuranose in 100 ml. of acetone. The mixture is heated at 45° and, in the course of 30 minutes, 52.0 g. of dimethyl sulfate are added in such manner that the temperature does not exceed 60°. The reaction is allowed to continue for another 30 minutes at 45°; the mixture is cooled to room temperature and is poured into 1500 ml. of ice-water, then extracted with diethyl ether. The solution is washed neutral with water, and evaporated. The residue is crystallized from ethanol and the pure 1,2-O-isopropylidene-3,5-di-O-methyl-6-O-benzyl-α-D-glucofuranose is obtained in the form of white crystals, M.P. 80–81°; $[\alpha]_D^{20} = -43° \pm 1°$ (c.=0.89 in chloroform).

A solution of 47.0 g. of 1,2-O-isopropylidene-3,5-di-O-methyl-6-O-benzyl-α-D-glucofuranose in 800 ml. of a 1 N solution of hydrogen chloride in ethanol is allowed to stand at room temperature for 16 hours, then freed from the bulk of ethanol and of hydrogen chloride. When the residue has cooled to 0–5°, it is dissolved in diethyl ether, and the solution is washed with an ice-cold saturated aqueous sodium hydrogen carbonate solution and with water, dried over sodium sulfate, and evaporated. The residue is distilled in a high vacuum; at 180°/0.008 mm. Hg, the pure ethyl-3,5-di-O-methyl-6-O-benzyl-D-glucofuranoside is obtained; $[\alpha]_D^{20} = -9° \pm 1°$ (c.=1.35 in chloroform).

A solution of 42.0 g. of ethyl-3,5-di-O-methyl-6-O-benzyl-D-glucofuranoside in 100 ml. of absolute pyridine is treated with 100 ml. of acetic acid anhydride, the reaction mixture is allowed to react at 80° for 2 hours, and the bulk of the pyridine and of the acetic anhydride is then evaporated off. The residue is dissolved in diethyl ether and the solution washed with ice-cold 2 N hydrochloric acid, a saturated aqueous sodium hydrogen carbonate solution and with water, dried over sodium sulfate, and evaporated under reduced pressure. The residue is distilled; at 180°/0.001 mm. Hg, the pure ethyl-2-O-acetyl - 3,5 - di-O-methyl-6-O-benzyl-D-glucofuranoside is obtained, $[\alpha]_D^{20} = +4° \pm 1°$ (c.=1.25 in chloroform).

A solution of 42.2 g. of ethyl-2-O-acetyl-3,5-di-O-methyl-6-O-benzyl-D-glucofuranoside in 400 ml. of pure ethanol is hydrogenated in the presence of 4 g. of a palladium-on-carbon catalyst (10%) at 35° and under atmospheric pressure until 2584 ml. of hydrogen are absorbed. The catalyst is filtered off, and the ethanol is then distilled off under reduced pressure. The residue is degassed in a high vacuum and the pure ethyl-2-O-acetyl-3,5-di-O-methyl-D-glucofuranoside is obtained as a colorless oil; $[\alpha]_D^{20} = +14° \pm 1°$ (c.=1.2 in chloroform). The substance can be purified by microdistillation, B.P. 110°/0.002 mm. Hg.

EXAMPLE 8

A solution of 1.0 g. of ethyl-3-O-n-propyl-5,6-di-O-salicyloyl-D-glucofuranoside in 10 ml. of 63% aqueous acetic acid is maintained at 60° for 16 hours. The bulk of the acetic acid is then distilled off under reduced pressure, and the residue is dissolved in diethyl ether. The solution is washed with a saturated aqueous sodium hydrogen carbonate solution and water, dried over sodium sulfate, and evaporated. The residue is purified by thin-layer chromatography (silica gel; system chloroform/ethyl acetate 85:15). The pure 3-O-n-propyl-5,6-di-O-salicyloyl-D-glucofuranose of the formula

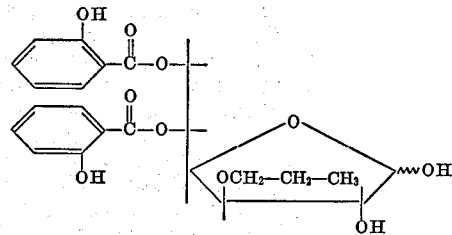

is obtained as a colorless oil; $R_f=0.2$; $[\alpha]_D^{20}=34.5°\pm2°$ (c.=0.5 in chloroform).

EXAMPLE 9

A solution of 20.0 g. of 1,2-O-isopropylidene-3-O-n-propyl-5,6-di-O-(2 - methoxy-benzoyl)-α-D-glucofuranose in 400 ml. of a 1 N solution of hydrogen chloride in ethanol is allowed to stand at room temperature for 16 hours. The reaction mixture is freed from the bulk of the ethanol and of the hydrogen chloride at 40° in a water-jet vacuum. When the residue has cooled to 0–5°, it is treated with 250 ml. of a saturated aqueous sodium hydrogen carbonate solution and extracted with diethyl ether. The organic extract is washed neutral with a saturated sodium hydrogen carbonate solution and with water. The diethyl ether solution is dried over sodium sulfate and evaporated under reduced pressure. The residue is chromatographed on silica gel (grain size 0.05–0.2 mm.; column), and eluted with an 85:15-mixture of chloroform and ethyl acetate, and degassed in a high vacuum. The pure ethyl-3-O-n-propyl-5,6-di-O-(2 - methoxy-benzoyl)-D-glucofuranoside of the formula

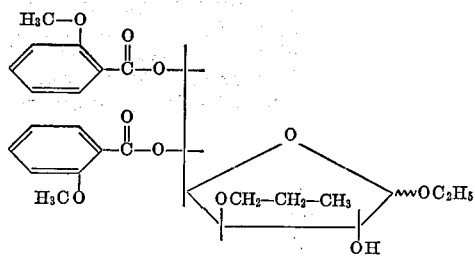

is obtained as a yellowish oil; $[\alpha]_D^{20}= -20°\pm2°$ (c.= 0.45 in chloroform). The resulting mixture of anomers can be resolved by thin-layer chromatography (silica gel; system chloroform/ethyl acetate 85:15); the α-anomer has an $R_f$ value of 0.34; $[\alpha]_D^{20}=+28°\pm1°$ (c.=1.1 in chloroform); and the β-anomer an $R_f$ value of 0.17; $[\alpha]_D^{20}= -54°\pm1°$ (c.=0.94 in chloroform).

The starting material can be prepared as follows:

A solution, warmed to 55°, of 35.4 g. of 1,2-O-isopropylidene-3-O-n-propyl-α-D-glucofuranose in 300 ml. of absolute pyridine and 150 ml. of methylene chloride is treated dropwise in the course of 2 hours with a solution of 50 g. of 2-methoxy-benzoyl chloride in 150 ml. of methylene chloride while being stirred. The reaction is allowed to proceed for another 30 minutes, and, after the addition of 20 ml. of water, the reaction mixture is evaporated at 50° under reduced pressure. The residue is extracted with diethyl ether; the organic extract is washed with ice-cold 2 N hydrochloric acid, water, a saturated aqueous sodium hydrogen carbonate solution, and again with water, dried over sodium sulfate, and evaporated under reduced pressure. The residue is distilled in a high vacuum; the pure 1,2-O-isopropylidene-3-O-n-propyl - 5,6 - di-O-(2-methoxy-benzoyl)-α-D-glucofuranose is obtained at 235°/0.007 mm. Hg; $[\alpha]_D^{20}= -23°\pm0.5°$ (c.=2.1 in chloroform).

EXAMPLE 10

A solution of 5 g. of 3-O-n-propyl - 5,6-di-O-salicyloyl-D-glucofuranose in 100 ml. of an 0.1 N-solution of hydrogen chloride in ethanol is allowed to stand at room temperature for 5 hours. The bulk of the ethanolic hydrogen chloride is then evaporated under reduced pressure, and the reaction mixture is neutralized with a saturated aqueous sodium hydrogen carbonate solution, and extracted with diethyl ether. The ether extracts are washed with water, dried over sodium sulfate, and evaporated under reduced pressure. On degassing in a high vacuum, the pure ethyl-3-O-n-propyl-5,6-di-O-salicyloyl-D-glucofuranoside is obtained as a pale yellowish oil, $[\alpha]_D^{20}=-33°\pm0.5°$ (c.=2.0 in chloroform).

EXAMPLE 11

A solution of 60.0 g. of 1,2-O-isopropylidene-3-O-n-propyl - 5,6 - di - O - salicyloyl - α - D - glucofuranose in 1000 ml. of a 1 N solution of hydrogen chloride in ethanol is allowed to stand at room temperature for 18 hours, then evaporated at 40° under reduced pressure. The residue is cooled to 0–5°, neutralized with a saturated aqueous sodium hydrogen carbonate solution, and extracted with diethyl ether. The organic extracts are washed with a saturated aqueous sodium hydrogen carbonate solution and with water, dried over sodium sulfate, and evaporated under reduced pressure. The residue is degassed in a high vacuum; it represents the ethyl-3-O-n-propyl - 5,6 - di - O - salicyloyl - D - glucofuranoside in the form of a slightly yellowish oil; $[\alpha]_D^{20}= -33°\pm0.5°$ (c.=2.0 in chloroform).

The starting material can be prepared as follows:

At a temperature of 50–55°, a solution of 104 g. of O-benzyl-salicylic acid chloride is added dropwise in the course of 4½ hours to a solution of 50.0 g. of 1,2-O-isopropylidene - 3 - O - n - propyl - α - D - glucofuranose in 500 ml. of pyridine and 250 ml. of methylene chloride. The reaction is allowed to proceed for another 30 minutes and the methylene chloride is then distilled off under reduced pressure. The residue is treated with 200 ml. of water, evaporated at 50–60° under reduced pressure; then 400 ml. of water are added, and the reaction mixture is extracted with diethyl ether. The organic extracts are washed with ice-cold 2 N hydrochloric acid, water, a saturated aqueous sodium hydrogen carbonate solution and with water, dried over sodium sulfate, and evaporated under reduced pressure. When the residue is degassed in a high vacuum, the crude 1,2-O-isopropylidene - 3 - O - n - propyl - 5,6 - di - O - (2 - benzyloxy-benzoyl)-α-D-glucofuranose is obtained as the residue; $[\alpha]_D^{20}=-14°\pm1°$ (c.=1.336 in chloroform); it is processed further without being purified.

A solution of 131.5 g. of 1,2-O-isopropylidene-3-O-n-propyl - 5,6 - di - O - (2 - benzoyloxy-benzoyl)-α-D-glucofuranose in 1300 ml. of pure ethanol is hydrogenated in the presence of 13.0 g. of a palladium-on-carbon catalyst (10%) at 50° under atmospheric pressure until 8590 ml. of hydrogen are absorbed. The catalyst is filtered off, and half of the ethanol is distilled off under atmospheric pressure. The concentrated solution is cooled to 0°, the white crystalline precipitate is filtered off and dried at 50° under reduced pressure. There is obtained in this manner the 1,2 - O - isopropylidene-3-O-n-propyl-5,6-di-O - salicyloyl - α - D - glucofuranose, M.P. 87–88°; $[\alpha]_D^{20}=-35°\pm1°$ (c.=0.971 in chloroform).

EXAMPLE 12

A solution of 6.0 g. of 1,2 - O - isopropylidene-3-O-n-propyl - 5,6 - di - O - (2 - benzyloxy-benzoyl)-α-D-glucofuranose in 100 ml. of a 1 N solution of hydrogen chloride in ethanol is allowed to stand at room temperature for 16 hours, then freed from the bulk of the ethanolic hydrogen chloride at 40° and under reduced pressure. The residue is cooled to 0–5°, neutralized with a saturated aqueous sodium hydrogen carbonate solution, and extracted with diethyl ether. The organic extracts are washed neutral with water, dried over sodium sulfate, and evaporated under reduced pressure. The resulting residue represents the ethyl - 3 - O - n - propyl-5,6-di-O-(2 - benzyloxy - benzoyl) - D - glucofuranoside of the formula

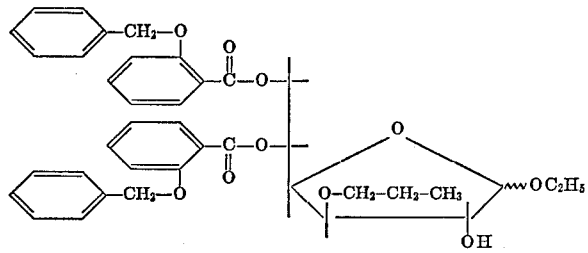

which is processed without further purification.

EXAMPLE 13

A solution of 5.9 g. of ethyl - 3 - O - n - propyl-5,6-di - O - (2 - benzyloxy - benzoyl) - D - glucofuranoside in 60 ml. of ethanol is hydrogenated in the presence of 0.6 g. of a palladium-on-carbon catalyst (10%) at 20° and under atmospheric pressure until 524 ml. of hydrogen are absorbed. The catalyst is filtered off and the ethanol is distilled off under reduced pressure. The residue is dissolved in diethyl ether, and the solution is washed with a saturated aqueous sodium hydrogen carbonate solution and water, dried over sodium sulfate, and evaporated under reduced pressure. The residue is degassed in a high vacuum, and the pure ethyl - 3 - O - n - propyl-5,6 - di - O - salicyloyl - D - glucofuranoside is obtained as a slightly yellowish oil, $[\alpha]_D^{20} = -33° \pm 0.5°$ (c.=2.0 in chloroform). The resulting anomer mixture is resolved by thin-layer chromatography (silica gel; system chloroform/ethyl acetate 85:15); the α-anomer has an Rf-value of 0.6, the β-anomer of 0.4.

EXAMPLE 14

A solution of 19.8 g. of 1,2-O-isopropylidene-3,5,6-tri - O - salicyloyl - α - D - glucofuranose in 400 ml. of a 1 N solution of hydrogen chloride in ethanol is allowed to stand at room temperature for 36 hours, and the bulk of the ethanolic hydrochloric acid is then distilled off under reduced pressure. The residue is mixed with 250 ml. of a saturated aqueous sodium hydrogen carbonate solution and extracted with diethyl ether. The organic extracts are washed with a saturated aqueous sodium hydrogen carbonate solution and with water, dried over sodium sulfate, and evaporated under reduced pressure. On degassing in a high vacuum, the pure ethyl - 3,5,6 tri-O-salicyloyl-D-glucofuranoside of the formula

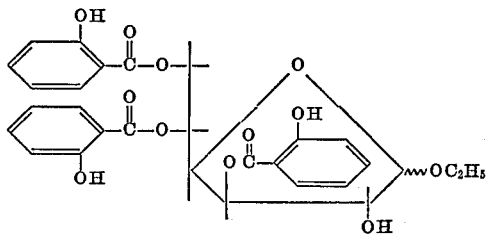

is obtained as a colorless, viscous oil, $[\alpha]_D^{20} = -80° \pm 1°$ (c.=1.2 in chloroform); thin-layer chromatographic separation (silica gel); α-anomer: $R_f=0.61$, and β-anomer: $R_f=0.47$ (system: chloroform/ethyl acetate 85:15).

The starting material can be prepared as follows:

A solution of 24.3 g. of 1,2-O-isopropylidene-α-D-glucofuranose in 450 ml. of absolute pyridine and 275 ml. of methylene chloride is treated dropwise in the course of 4 hours with a solution of 111 g. of 2-benzyloxy-benzoyl chloride in 250 ml. of methylene chloride while stirring and keeping the temperature at 50–55°. The reaction is allowed to proceed for 30 minutes at the above temperature, the methylene chloride is distilled off under reduced pressure and the remaining solution is treated with water. The reaction mixture is then evaporated to dryness under reduced pressure, the residue is treated with water, and extracted with diethyl ether. The organic extracts are washed with ice-cold 2 N hydrochloric acid, water, a saturated aqueous sodium hydrogen carbonate solution and water, dried over sodium sulfate, and evaporated. The residue is crystallized from diethyl ether and dried to yield the pure, crystalline 1,2-O-isopropylidene-3,5,6-tri-O-(2-benzyloxy-benzoyl) - α - D-glucofuranose, M.P. 108°; $[\alpha]_D^{20} = -55° \pm 1°$ (c.=0.95 in chloroform).

A solution of 45.0 g. of 1,2-O-isopropylidene-3,5,6-tri-O-(2-benzyloxy-benzoyl)-α-D-glucofuranose in 450 ml. of tetrahydrofuran is hydrogenated in the presence of 4.5 g. of a palladium-on-carbon catalyst (10%) at 50° under atmospheric pressure until the uptake of hydrogen ceases. The catalyst is filtered off, the bulk of the tetrahydrofuran is distilled off from the filtrate under reduced pressure, and the residue is dissolved in diethyl ether. The organic solution is washed with a saturated aqueous sodium hydrogen carbonate solution and with water, dried over sodium sulfate, and evaporated under reduced pressure. The residue is degassed under a high vacuum and yields the pure 1,2-O-isopropylidene - 3,5,6 - tri - O - salicyloyl - α - D-glucofuranose, $[\alpha]_D^{20} = -91° \pm 1°$ (c.=1.0 in chloroform), as a viscous, colorless oil.

EXAMPLE 15

A solution of 17.0 g. of 1,2-O-isopropylidene-3-O-n-propyl - 5,6 - di-O-(5-chloro-2-hydroxy-benzoyl) - α - D-glucofuranose in 400 ml. of a 1 N solution of hydrogen chloride in ethanol is allowed to stand at room temperature for 16 hours, then freed from the bulk of the ethanolic hydrogen chloride in a water-jet vacuum at 40°. The residue is cooled to 0–5° and extracted with diethyl ether; the organic extracts are washed neutral with an ice-cold, saturated aqueous sodium hydrogen carbonate solution and with ice-water, dried over sodium sulfate, evaporated, and degassed in a high vacuum. There is obtained in this manner the pure ethyl-3-O-n-propyl-5,6-di-O-(5-chloro-2-hydroxy-benzoyl) - D - glucofuranoside of the formula

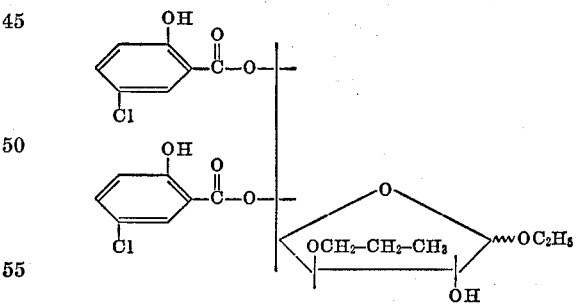

as a brown-colored oil, $[\alpha]_D^{20} = +7° \pm 1°$ (c.=1.13 in chloroform).

The starting material can be prepared as follows:

A solution of 20.0 g. of 1,2 - O - isopropylidene-3-O-n-propyl-α-D-glucofuranose in 200 ml. of absolute pyridine and 200 ml. of methylene chloride is stirred at 55° while being treated dropwise in the course of 4 hours with a solution of 53.5 g. of 2-benzyloxy-5-chlorobenzoyl chloride in 125 ml. of methylene chloride. The reaction is allowed to continue for 30 minutes, 20 ml. of water are then added, and the reaction mixture is then evaporated under reduced pressure. The residue is treated with water and extracted with diethyl ether. The organic extracts are washed with ice-cold 2 N hydrochloric acid, water, a saturated aqueous sodium hydrogen carbonate solution, and water, dried over sodium sulfate, and evaporated under reduced pressure. On degassing the residue in a high vacuum, the 1,2 - O - isopropylidene-3-O-n-propyl-5,6-di-O-

(2-benzyloxy-5-chloro-benzoyl) - α - D-glucofuranose is obtained, [α]$_D^{20}$=—11°±0.5° (c.=2.08 in chloroform), which can be used in the next step without prior purification.

A solution of 58.0 g. of 1,2 - O - isopropylidene-3-O-n-propyl-5,6-di-O-(2-benzyloxy-5-chloro-benzoyl) - α - D-glucofuranose is hydrogenated in the presence of 6.0 g. of a palladium-on-carbon catalyst (10%) at 50° and under atmospheric pressure until the hydrogen uptake ceases. The catalyst is filtered off, the bulk of the tetrahydrofuran is distilled from the filtrate under reduced pressure, and the residue is dissolved in diethyl ether. The organic solution is washed with a saturated aqueous sodium hydrogen carbonate solution and with water, dried over sodium sulfate, and evaporated under reduced pressure. The residue is degassed for 2 hours at 70° in a high vacuum, and yields the pure 1,2-O-isopropylidene-3-O-n-propyl-5,6-di-O-(5-chloro - 2 - hydroxy-benzoyl) - α - D-glucofuranose, [α]$_D^{20}$=—24°±2° (c.=1.87 in chloroform); thin-layer chromatogram (silica gel): R$_f$=0.67 (system chloroform/ethyl acetate 85:15).

EXAMPLE 16

A solution of 19.0 g. of 1,2-O-isopropylidene-3-O-benzyl-5-O-(2-acetyloxy-benzoyl) - α - D-xylofuranose in 400 ml. of a 1 N ethanolic solution of hydrogen chloride is allowed to stand at room temperature for 16 hours; then the bulk of the ethanolic hydrogen chloride is distilled off at 40° under reduced pressure. The residue is cooled to 0–5° and mixed with 170 ml. of a saturated aqueous sodium hydrogen carbonate solution. The mixture is extracted with diethyl ether and the organic extract is washed with a saturated aqueous sodium hydrogen carbonate solution and with water, dried over sodium sulfate, and evaporated at 40° in a water-jet vacuum. On degassing the residue in a high vacuum, the pure ethyl-3-O-benzyl-5-O-salicyloyl-D-xylofuranoside of the formula

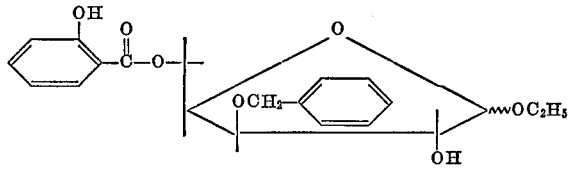

is obtained as a colorless oil, [α]$_D^{20}$=+9°±0.5° (c.=1.8 in chloroform); microdistillation: B.P. 200°/0.04 mm. Hg.

The starting material can be prepared as follows:
A solution of 13.6 g. of 1,2-O-isopropylidene-3-O-benzyl-α-D-xylofuranose in 60 ml. of pyridine and 40 ml. of methylene chloride is treated dropwise in the course of one hour with a solution of 9.7 g. of 2-acetyloxy-benzoyl-chloride in 20 ml. of methylene chloride while being stirred at 50–55°. The reaction is allowed to continue for 30 minutes at 50–55°, the methylene chloride is distilled off under reduced pressure, and the residue is treated with 240 ml. of ice-water. The reaction mixture is extracted with diethyl ether, the combined organic extracts are washed with ice-cold 2 N hydrochloric acid, water, a saturated aqueous sodium hydrogen carbonate solution and water, dried over sodium sulfate, and evaporated under reduced pressure. When the residue is degassed in a high vacuum, the pure 1,2-O-isopropylidene-3-O-benzyl-5-O-(2 - acetyloxy - benzoyl)-α-D-xylofuranose is obtained as a yellowish oil, [α]$_D^{20}$=—52°±1° (c.=1.66 in chloroform); thin-layer chromatogram (silica gel); R$_f$=0.6 (system chloroform/ethyl acetate 85:15).

EXAMPLE 17

A solution of 61.0 g. of 1,2-O-isopropylidene-3-O-n-propyl-6-O-(2-acetyloxy - benzoyl)-α-D-glucofuranose in 400 ml. of a 1 N solution of hydrogen chloride in ethanol is allowed to stand at room temperature for 21 hours; the bulk of the ethanolic hydrogen chloride is then removed at 40° in a water-jet vacuum. The residue is dissolved in 300 ml. of chloroform and allowed to stand at room temperature with 5 ml. of 1 N ethanolic hydrogen chloride for 20 hours. The reaction mixture is washed with a saturated aqueous sodium hydrogen carbonate solution and water, dried over sodium sulfate, and evaporated under reduced pressure. On crystallization of the residue from a mixture of diethyl ether and petroleum ether, the pure ethyl-3-O-n-propyl-6-O-salicyloyl-β-D-glucopyranoside of the formula

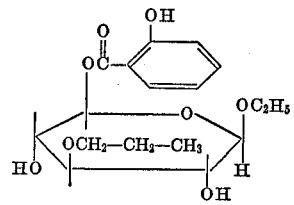

is obtained in the form of white crystals, M.P. 116–116.5°; [α]$_D^{20}$=—35°±1° (c.=1.0 in chloroform).

The starting material can be prepared as follows:
A solution of 30.0 g. of 1,2-O-isopropylidene-3-O-n-propyl-α-D-glucofuranose in 96 ml. of pyridine and 48 ml. of methylene chloride is treated dropwise at 20° in the course of 2 hours with a solution of 23 g. of O-acetyl-salicylic acid chloride in 48 ml. of methylene chloride. The reaction is allowed to continue for another 30 minutes, the resulting precipitate is filtered off, and the filtrate is evaporated at 40–50° under reduced pressure. The residue is treated with water and extracted with diethyl ether. The combined organic extracts are washed with ice-cold 2 N hydrochloric acid, a saturated aqueous sodium hydrogen carbonate solution and with water, dried over sodium sulfate, then evaporated. The residue pressure. The residue represents the 1,2-O-isopropylidene-3-O-n-propyl-6-O-(2-acetyloxy - benzoyl)-α-D-glucofuranose, which is processed further without purification.

EXAMPLE 18

A solution of 20.0 g. of 1,2-O-isopropylidene-3-O-n-propyl-5,6-di-O-salicyloyl-α-D-glucofuranose in 500 ml. of a 1 N solution of hydrogen chloride in n-butanol is allowed to stand at room temperature for 16 hours, then freed from the bulk of the n-butanolic hydrogen chloride. The residue is treated with 150 ml. of a saturated aqueous sodium hydrogen carbonate solution at 0–5°, and extracted with diethyl ether. The combined organic extracts are washed with a saturated aqueous sodium hydrogen carbonate solution and with water, dried over sodium sulfate, and evaporated under reduced pressure. When the residue is degassed in a high vacuum, the pure n-butyl-3-O-n-propyl-5,6-di - O-salicyloyl-D-glucofuranoside of the formula

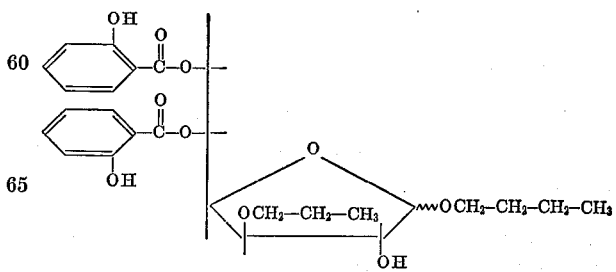

is obtained as a faintly yellowish oil, [α]$_D^{20}$=—45°±1° (c.=1.0 in chloroform). The resulting anomer mixture can be resolved by thin-layer chromatography (silica gel; system chloroform/ethyl acetate 85:15) into the individual anomers; α-anomer; R$_f$=0.63; β-anomer; R$_f$=0.42.

EXAMPLE 19

Capsules, each containing 0.2 g. of the active substance, can be made as follows:

Composition (for 10000 capsules)

| | G. |
|---|---|
| Ethyl-3-O-n-propyl-5,6-di - O - salicyloyl-D-gluco-furanoside | 2000 |
| Absolute ethanol | 200 |

The ethyl-3-O-n-propyl-5,6-di - O - salicyloyl-D-glucofuranoside is mixed with the ethanol and the mixture is filled into soft gelatine capsules on a suitable capsulating machine. Instead of the above active substance, the ethyl-3-O-n-propyl-5-O-(4 - chlorobenzyl)-6-O-salicyloyl-D-glucofuranoside may, for example, be used.

EXAMPLE 20

A solution of 21.0 g. of 1,2-O-isopropylidene-3-O-n-propyl-5,6-di-O-salicyloyl-α-D-allofuranose in 300 ml. of a 1 N solution of hydrogen chloride in ethanol is allowed to stand at room temperature for 16 hours. The reaction mixture is then freed from the major portion of the ethanolic hydrogen chloride at 40°. The residue is taken up in diethyl ether and the solution is washed with a saturated aqueous sodium hydrogen carbonate and water and dried over sodium sulfate, and evaporated under reduced is degassed under a high vacuum at 70° and one thus obtains the pure ethyl-3-O-n-propyl-5,6-di-O-salicyloyl-D-allofuranose of the formula

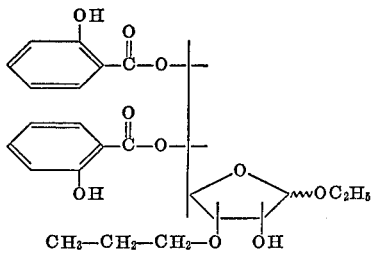

as a slightly yellow oil, $[\alpha]_D^{20} = -25° \pm 0.5°$ (c.=2.0 in chloroform).

The resulting anomer mixture can be separated by thin layer chromatography (silica gel SL 254 of Merck, Darmstadt; system: chloroform/ethyl acetate 85:15); the α-anomer shows an $R_f$-value of 0.6, the β-anomer an $R_f$-value of 0.5.

The starting material may be prepared as follows:

A suspension of 28.6 g. of powdered potassium hydroxide in 200 ml. of dimethylsulfoxide is treated with a solution of 60 g. of 1,5;5,6-bis-O-isopropylidene-α-D-allofuranose in 100 ml of dimethylsulfoxide while stirring and maintaining an atmosphere of nitrogen. After warming the reaction mixture to 50–55°, a solution of 30.8 g. of allyl bromide in 100 ml. of dimethylsulfoxide is added dropwise within 3 hours. The dark reaction mixture is then poured into ice-water and extracted with diethyl ether. The ether solution is washed with water, dried over sodium sulfate and evaporated. The residue is distilled under high vacuum and one obtains thus the 1,2;5,6 - bis-O-isoproylidene-3-O-allyl-α-D-allofuranose as a colorless oil, M.P. 120–127°/0.06 mm. Hg.

$$[\alpha]_D^{20} = +99° \pm 1°$$

(c.=1.2 in chloroform).

A solution of 62.0 g. of 1,2:5,6-bis-O-isopropyidene-3-O-allyl-α-D-allofuranose in 620 ml. of methanol (95%; non-denatured) is hydrogenated in the presence of 6.2 g. of a palladium-on-charcoal catalyst (10%) under normal pressure and at a temperature of 50° until the hydrogen uptake ceases. The catalyst is filtered off, the ethanol is distilled off and one obtains as the residue the 1,2;5,6-bis-O-isopropylidene-3-O-n-propyl-α-D-allofuranose, thin-layer chromatography (silica gel SL 254 of Merck, Darmstadt; system: chloroform/ethyl acetate 85:15): $R_f = 0.45$.

A solution of 56.0 g. of 1,2;5,6-bis-O-isopropylidene-3-O-n-propyl-α-D-allofuranose in 250 ml. of 60% aqueous acetic acid is stirred over a period of 6 hours. The major portion of the acetic acid is then distilled off under a reduced pressure at a temperature of 40°. The residue is neutralized with an ice-cold 2 N aqueous sodium hydroxide solution and again taken to dryness under reduced pressure and at a temperature of 40°. The residue is taken up in diethyl ether and the resulting sodium acetate is filtered off. The ether solution is washed neutral with a small amount of water, dried over sodium sulfate and evaporated. After degassing under a high vacuum the 1,2-O-isopropylidene-3-O-n-propyl-α-D-allofuranose is obtained, $[\alpha]_D^{20} = +94° \pm 1°$ (c.=1.2 in chloroform), which is used without further purification.

A solution of 39.0 g. of 1,2-O-isopropylidene-3-O-n-propyl-α-D-allofuranose in 40 ml. of pyridine and 200 ml. of methylene chloride is warmed to 55° under exclusion of moisture in a nitrogen atmosphere and is treated, while stirring, over a period of 5 hours dropwise with a solution of 113.0 g. of 2-benzyloxy-benzoic acid chloride in 200 ml. of methylene chloride, then evaporated under water jet vacuum at 50°. The residue is extracted with diethyl ether and the ether solution is washed with ice-cold 2 N hydrochloric acid, a saturated aqueous sodium carbonate solution and water, dried over sodium sulfate and evaporated. One thus obtains the 1,2-O-isopropylidene-3-O-n-propyl - 5,6 - di - O - (2 - benzyloxybenzoyl)-α-D-allofuranose, which is used without further purification.

A solution of 114.0 g. of 1,2-O-isopropylidene-3-O-n-propyl-5,6-di-O-(2 - benzyloxy-benzoyl)-α-D-allofuranose in 1140 ml. of ethanol (95%; non-denatured) is hydrogenated under normal pressure and at 50° in the presence of 10 g. of a palladium-on-charcoal catalyst (10%) until the hydrogen uptake ceases. After filtering off the catalyst, the ethanol is distilled off under reduced pressure, the residue is degassed under high vacuum at 70° and one thus obtains the pure 1,2-O-isopropylidene-3-O-n-propyl-5,6-di-O-salicyloyl-α-D-allofuranose, $$[\alpha]_D^{20} = +76° \pm 1°$$

(c.=1 in chloroform).

EXAMPLE 21

A solution of 17.0 g. of 1,2-O-isopropylidene-3,6-di-O-benzyl-5-O-salicyloyl-α-D-glucofuranose in 400 ml. of a 1 N solution of hydrogen chloride in ethanol is allowed to stand for 16 hours at room temperature. The reaction mixture is then evaporated under water jet vacuum, cooled to 0–5° and the residue is neutralized with a saturated aqueous sodium hydrogen carbonate. The resulting suspension is extracted with diethyl ether; the ether extracts are washed with a saturated aqueous sodium carbonate solution and with water, dried over sodium sulfate and evaporated. The residue is degassed under a high vacuum at 70° and yields the pure ethyl-3,6-di-O-benzyl-5-O-salicyloyl-D-glucofuranoside of the formula

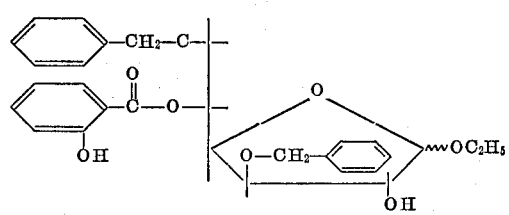

as a yellowish oil, $[\alpha]_D^{20} = -33° \pm 1°$ (c.=1.0 in chloroform).

The resulting anomer mixture is separated by thin-layer chromatography (silica gel SL 254 of Merck, Darmstadt; system: chloroform/ethyl acetate 85:15); the α-anomer shows an $R_f$-value of 0.58, the β-anomer an $R_f$-value of 0.35.

The starting material is prepared as follows:

In an atmosphere of nitrogen, a solution of 25.0 g. of 1,2 - O-isopropylidene-3,6-di-O-benzyl-α-D-glucofuranose in 125 ml. of methylene chloride and 250 ml. of absolute pyridine is treated dropwise within 4 hours and while maintaining a temperature of 50–55° a solution of 23.1 g. of 2-benzyloxy benzoic acid chloride in 125 ml. of methylene chloride. The reaction is allowed to proceed for another 2 hours and the mixture is treated with 20 ml. of water, then evaporated under reduced pressure and at 50° and the residue extracted with diethyl ether. The ether extracts are washed with ice-cold 2 N hydrochloric acid, a small amount of water, a saturated aqueous sodium carbonate solution and again with water, dried over sodium sulfate and evaporated under water jet vacuum. The residue is degassed under high vacuum and at 70° and yields the 1,2-O-iso-propylidene-3,6-di-O-benzyl-5-O-(2-benzyloxybenzoyl) - α - D- glucofuranose as a viscous oil, $[\alpha]_D^{20}=-41°\pm1°$ (c.=1.0 in chloroform); thin-layer chromatography (silica gel SL 254 of Merck, Darmstadt; system: chloroform/ethyl acetate 85:15): $R_f=0.6$.

A solution of 39.8 g. of 1,2-O-isopropylidene-3,6-di-.O-benzyl-5-O-(2-benzyloxy-benzoyl) - α-D-glucofuranose in 400 ml. of tetrahydrofuran is hydrogenated under normal pressure and at 20° in the presence of 4 g. of a palladium-on-charcoal catalyst (10%) until a total of 1460 ml. of hydrogen have been absorbed. The catalyst is filtered off, the filtrate is freed under reduced pressure from the major portion of the tetrahydrofuran, the residue is degassed under high vacuum at 70° and one obtains the pure 1,2-O-isopropylidene-3,6-di-O-benzyl-5-O-salicycloyl - α - D-glucofuranose, $[\alpha]_D^{20}=-53°\pm1°$ (c.=1.1 in chloroform); thin-layer chromatography (silica gel SL 254 of Merck, Darmstadt; system: chloroform/ethyl acetate 85:15): $R_f=0.65$.

EXAMPLE 22

A solution of 17.0 g. of 1,2-isopropylidene-3,5-di-O-n-propyl-6-O-salicyloyl-α-D-glucofuranose in 400 ml. of a 1 N solution of hydrogen chloride in ethanol is allowed to stand at room temperature for 16 hours. The reaction mixture is then freed under reduced pressure from the major portion of the ethanolic hydrogen chloride and the residue is neutralized at 0–5° with a saturated aqueous sodium hydrogen carbonate solution. The reaction mixture is extracted with diethyl ether; the organic extract is washed with a saturated aqueous sodium carbonate solution and wate r, dried over sodium sulfate and evaporated. The ethyl-3,5-di-O-n-propyl-6-O-salicyloyl-D-glucofuranoside of the formula

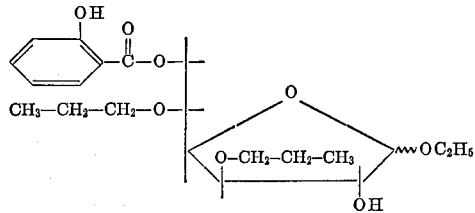

is obtained as a yellowish oil, $[\alpha]_D^{20}=+20°\pm1°$ (c.=1.1 in chloroform).

The resulting anomer mixture is separated by thin-layer chromatography (silica gel SL 254 of Merck, Darmstadt; system: chloroform/ethyl acetate 85:15); the β-anomer has an $R_f$-value of 0.32, the α-anomer and $R_f$-value of 0.58.

The starting material may be prepared as follows:

A solution of 220.0 g. of 1,2-isopropylidene-α-D-glucofuranose in 800 ml. of pyridine is treated with 278.5 g. of triphenylmethyl chloride and shaken until a complete solution is attained, then allowed to stand at room temperature for 48 hours. After diluting with 100 ml. of water, the pyridine is distilled off under water jet vacuum and the residue is crystallized from a mixture of diethyl ether and pertoleum ether. The dried, yellowish crystals represent the pure 1,2-O-isopropylidene-6-O-triphenylmethyl-α-D-glucofuranose, M.P. 145–146°;

$[\alpha]_D^{20}=-8°\pm1°$ (c.=0.92 in chloroform).

In a nitrogen atmosphere a suspension of 106.0 g. of powderized potassium hydroxide in 300 ml. of dimethylsulfoxide is prepared and then treated while stirring with a solution of 200 g. 1,2-O-isopropylidene-6-O-triphenylmethyl-α-D-glucofuranose in 1200 ml. dimethylsulfoxide. The mixture is warmed to 50°; within a period of 2 hours a solution of 161.0 g. of allyl bromide in 100 ml. of dimethylsulfoxide is added dropwise. The mixture is cooled and poured into ice-water. The mixture is extracted with diethyl ether; the organic extract is washed with water until neutral, dried over sodium sulfate and evaporated under reduced pressure. The residue represents the 1,2-O-isopropylidene-3,5 - di-O-allyl-6-O-triphenylmethyl-α-D-glucofuranose, which is used without further purification.

A solution of 181.0 g. of 1,2-O-isopropylidene-3,5-di-O-allyl-6-O-triphenylmethyl-α-D-glucofuranose in 1000 ml. of glacial acetic acid is treated dropwise with 418 ml. of 1 N hydrochloric acid. After adding 500 ml. of water, the precipitated triphenylmethanol is filtered off. The filtrate is diluted with 800 ml. of water and extracted with diethyl ether. The ether extracts are washed with a 10 N aqueous sodium hydroxide solution and water, dried over sodium sulfate and evaporated. The residue is purified by chromatography (column), using silica gel (grain diameter 0.05–0.2 mm.; Merck, Darmstadt) and the 1,2-isopropylidene-3,5-di-O-allyl-α-D-glucofuranose is eluted with a 85:15-mixture of chloroform and ethyl acetate; thin-layer chromatography (silica gel SL 254 of Merck, Darmstadt; system: chloroform/ethyl acetate 85: 15): $R_f=0.3$.

A solution of 26.0 g. of 1,2-isopropylidene-3,5-di-O-allyl-α-D-glucofuranose in 260 ml. of ethanol is hydrogenated in the presence of 1 g. of a palladium-on-charcoal catalyst (10%) until the hydrogen uptake ceases. The catalyst is filtered off, the filtrate is evaporated under water jet vacuum and the residue is purified by chromatography (column; silica gel; grain diameter 0.05–0.2 mm.; of Merck, Darmstadt); the 1,2-O-isopropylidene-3,5-di-O-n-propyl-α-D-glucofuranose is eluted with an 85:15-mixture of chloroform and ethyl acetate.

In an atmosphere of nitrogen, a solution of 30.4 g. of 1,2-O-isopropylidene-3,5-di-O-n-propyl-α-D-glucofuranose in 250 ml. of pyridine and 125 of methylene chloride is treated within a period of 5 hours while stirring and at a temperature of 50–55° with a solution of 37.0 g. 2-benzyloxy-benzoic acid chloride in 125 ml. of methylene chloride, then diluted with 20 ml. of water. The reaction mixture is evaporated under reduced pressure and at 50°, the residue is taken up in diethyl ether and the solution is washed with ice-cold 2 N hydrochloric acid, water, a saturated aqueous sodium hydrogen carbonate solution and water, dried over sodium sulfate and evaporated. The resulting 1,2-O-isopropylidene-3,5-di-O-n-propyl-6 - O-(2-benzyloxy-benzoyl)-α-D-glucofuranose is used without further purification.

A solution of 54.4 g. of 1,2-O-isopropylidene-3,5-di-O-n-propyl-6-O-(2-benzyloxy - benzoyl)-α-D-glucofuranose in 300 ml. of tetrahydrofuran is hydrogenated in the presence of 5.0 g. of a palladium-on-charcoal catalyst (10%) and at a temperature of 50° until the hydrogen uptake ceases. The catalyst is filtered off, the filtrate is dried over sodium sulfate and evaporated under a water jet vacuum. The residue is degassed under high vacuum and one obtains the pure 1,2-O-isopropylidene-3,5-di-O-n-propyl-6-O-salicyloyl-α-D-glucofuranose as a yellowish oil, $[\alpha]_D^{20}=+20°\pm1°$ (c.=1.1 in chloroform), thin-layer chromatography (silica gel SL 254 of Merck, Darmstadt; system: chloroform/ethyl acetate 85:15): $R_f=0.06$.

EXAMPLE 23

A solution of 17.0 g. of 1,2-O-isopropylidene-3,5-di-O-salicycloyl-6-O-n-propyl-α-D-glucofuranose in 400 ml. of a 1 N solution of hydrogen chloride in ethanol is allowed to stand at room temperature for 16 hours. The major portion of the ethanolic hydrogen chloride is evaporated under water jet vacuum, the residue is again dissolved in 400 ml. of a 1 N ethanolic hydrogen chloride solution and the mixture is allowed to stand at 20° for another 20 hours, then evaporated under reduced pressure. The residue is extracted with diethyl ether, the organic extract is washed with an ice-cold saturated aqueous sodium hydrogen carbonate solution and water, dried over sodium sulfate and evaporated. The residue is degassed under high vacuum and one obtains the ethyl-3,5-di-O-salicyloyl-6-O-n-propyl-D-glucofuranoside of the formula

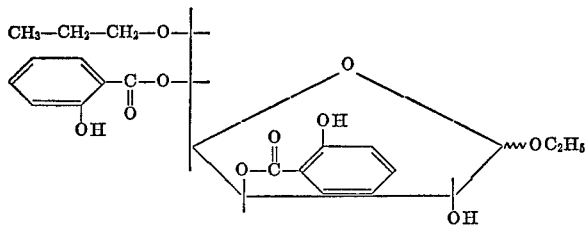

as a lightly yellow, viscous oil, $[\alpha]_D^{20} = -80° \pm 1°$ (c.=1.46 in chloroform).

The resulting anomer mixture is separated by thin-layer chromatography (silica gel SL 254 of Merck, Darmstadt; system: chloroform/ethyl acetate 85:15); the β-anomer has an $R_f$-value of 0.40, the α-anomer an $R_f$-value of 0.55.

The starting material may be prepared as follows:

A solution of 11.8 g. of sodium in 1000 ml. of n-propanol is treated with 100 g. of 1,2-O-isopropylidene-5,6-anhydro-α-D-glucofuranose; the resulting solution is allowed to stand at room temperature for 72 hours, then neutralized with 2 N sulfuric acid and evaporated under water jet vacuum. The residue is taken up in diethyl ether and the solution is washed neutral with a small amount of water, dried over sodium sulfate and evaporated. The residue is dissolved in 200 ml. of pyridine and 200 ml. of acetic acid anhydride and allowed to stand for 16 hours at room temperature, then evaporated under a water jet vacuum. The residue is taken up in diethyl ether; the ether solution is washed with ice-cold 2 N hydrochloric acid, water, a saturated aqueous sodium hydrogen carbonate solution and water, dried over sodium sulfate and evaporated under reduced pressure. The residue is distilled under high vacuum; B.P. 130–133°/0.01 mm. Hg. The resulting pure 1,2-O-isopropylidene-3,5-di-O-acetyl-6-O-n-propyl-α-D-glucofuranose, $[\alpha]_D^{20} = +10° \pm 1°$ (c.=1.50 in chloroform), is dissolved in 400 ml. of methanol and treated with a solution of 32.8 g. potassium hydroxide in 300 ml. of methanol. The reaction is allowed to proceed to room temperature for 30 minutes; the reaction mixture is then neutralized with 2 N hydrochloric acid and evaporated. The residue is taken up in diethyl ether, washed with a small amount of water, dried over sodium sulfate and evaporated. The residue represents the pure 1,2-O-isopropylidene - 6 - O - n - propyl - α - D - glucofuranose, $[\alpha]_D^{20} = -7° \pm 5°$ (c.=1.76 in chloroform).

A solution of 30 g. of 1,2-O-isopropylidene-6-O-n-propyl-α-D-glucofuranose in 250 ml. of pyridine and 125 ml. of methylene chloride is treated under exclusion of moisture and in an atmosphere of nitrogen and while maintaining a temperature of 50–55° with a solution of 99.0 g. of 2-benzyloxy-benzoic acid chloride, which is added over a period of 4 hours, then with 20 ml. of water. The major portion of the solvent is evaporated under reduced pressure, the residue is taken up in diethyl ether and the solution is washed with ice-cold 2 N hydrochloric acid, water, a saturated aqueous sodium carbonate solution and water, dried over sodium sulfate and evaporated. The residue represents the 1,2-O-isopropylidene-3,5-di-O-(2-benzyloxy-benzoyl) - 6 - O - n - propyl - α - D - glucofuranose, which is used without further purification.

A solution of 97.2 g. of 1,2-O-isopropylidene-3,5-di-O-(2-benzyloxy-benzoyl) - 6 - O - n - propyl - α - D - glucofuranose in 500 ml. of tetrahydrofuran is hydrogenated in the presence of 10 g. of a palladium-on-charcoal catalyst (10%) until the hydrogen uptake ceases. The catalyst is filtered off, the filtrate is evaporated under reduced pressure and the residue is taken up in diethyl ether. The solution is washed with a saturated aqueous sodium carbonate solution and water, dried over sodium sulfate and evaporated under reduced pressure. The residue is degassed under high vacuum at 190° and represents the pure 1,2-O-isopropylidene - 3,5 - di - O - salicyloyl-6-O-n-propyl-α-D-glucofuranose, $[\alpha]_D^{20} = -72° \pm 1°$ (c.=1.0 in chloroform); thin-layer chromatography (silica gel SL 254 of Merck, Darmstadt; system: chloroform/ethyl acetate 85:15): $R_f = 0.60$.

EXAMPLE 24

A solution of 18.0 g. of ethyl-2-O-acetyl-3,5-di-O-methyl-6-O-salicyloyl-D-glucofuranoside in 250 ml. of a 1 N solution of hydrogen chloride in ethanol is allowed to stand at room temperature for 17 hours, then freed from the major portion of the ethanolic hydrogen chloride. The residue is taken up in diethyl ether, the ether solution is washed with a saturated aqueous sodium hydrogen carbonate solution and water, dried over sodium sulfate and evaporated. The residue is degassed at 30° under high vacuum to yield the ethyl-3,5-di-O-methyl-6-O-salicyloyl-D-glucofuranoside of the formula

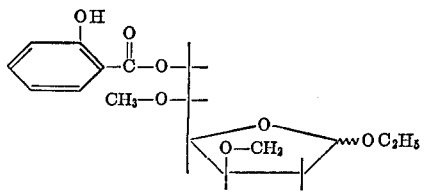

as a yellowish oil, $[\alpha]_D^{20} = +1° \pm 1°$ (c.=1.0 in chloroform).

The resulting anomer mixture is separated by thin-layer chromatography (silica gel SL 254 of Merck, Darmstadt; system: chloroform/ethyl acetate 85:15); the β-anomer has an $R_f$-value of 0.15, the α-anomer in $R_f$-value of 0.38.

EXAMPLE 25

A solution of 21.8 g. of 1,2 - O - isopropylidene-3-O-benzyl-5,6-di-O-salicyloyl - α - D - glucofuranose in 500 ml. of a 1 N ethanolic hydrogen chloride solution is allowed to stand at room temperature for 16 hours. The reaction mixture is evaporated under reduced pressure and the residue is neutralized at 0–5° with a saturated aqueous sodium hydrogen carbonate solution. The mixture is extracted with diethyl ether; the ether extracts are washed with a saturated sodium hydrogen carbonate solution and water, dried over sodium sulfate and evaporated. The residue is purified by thin-layer chromatography (silica gel PF 254 of Merck, Darmstadt; system: chloroform/ethyl acetate 85:15) to yield the ethyl-3-O-benzyl-5,6-di-O-salicyloyl-α-D-glucofuranoside of the formula

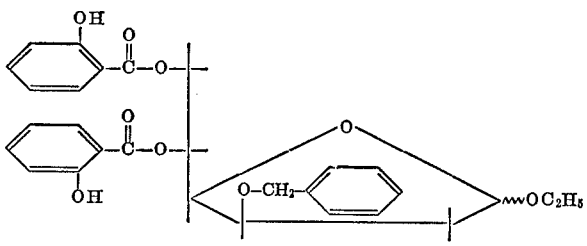

as a yellow oil; $[\alpha]_D^{20} = -36° \pm 1°$ (c.=1.1 in chloroform). The resulting anomer mixture is separated by thin-layer chromatography (silica gel SL 254 of Merck, Darmstadt; system: chloroform/ethyl acetate 85:15); the β-anomer has an $R_f$-value of 0.32, the α-anomer an $R_f$-value of 0.55.

The starting material can be prepared as follows:

A solution of 31.0 g. of 12-O-isopropylidene-3-O-benzyl-α-D-glucofuranose in 300 ml. of pyridine is treated while stirring and at 55° within a period of 4 hours with a solution of 61.5 g. of 2-benzyloxy-benzoic acid chloride in 150 ml. chloride. The reaction mixture is treated with 20 ml. of water and evaporated under water jet vacuum; the residue is treated with 200 ml. of water and extracted with diethyl ether. The organic extracts are washed with ice-cold 2 N hydrochloric acid, water, a saturated aqueous sodium hydrogen carbonate solution and water, dried over sodium sulfate and evaporated. The residue represents the 1,2 - O - isopropylidene-3-O-benzyl - 5,6 - di-O-(2-benzyloxy-benzoyl)-α-D-glucofuranose, which is used without further purification.

A solution of 28.0 g. of 1,2-O-isopropylidene-3-O-benzyloxy-benzoyl)-α-D-glucofuranose in 100 ml. of tetrahydrofuran is hydrogenated at 40° in the presence of 3 g. of a palladium-on-charcoal-catalyst until a total of 1730 ml. of hydrogen have been absorbed. The catalyst is filtered off, the filtrate is evaporated under reduced pressure, and the residue is taken up in diethyl ether. The ether solution is washed with a saturated aqueous sodium carbonate solution and water, dried over sodium sulfate and evaporated under reduced pressure. The residue is dried under high vacuum at 70° to yield the 1,2-O-isopropylidene - 3 - O - benzyl - 5,6 - di - O - salicyloyl-α-D-glucofuranose, $[\alpha]_D^{20} = -60° \pm 1°$ (c.=1.3 in chloroform).

EXAMPLE 26

A solution of 40 g. of ethyl-3,5,6-tri-O-benzyl-D-glucofuranoside in 100 ml. of pyridine is treated at 0–5° with a solution of 33.2 g. of 2-acetyloxy-benzoic acid chloride in 150 ml. of chloroform and allowed to stand for 16 hours at room temperature, then diluted with 25 ml. of water and evaporated under reduced pressure. The residue is taken up in diethyl ether; the ether solution is washed with ice-cold 2 N sulfuric acid, a saturated aqueous sodium hydrogen carbonate solution and water, dried over sodium sulfate and evaporated under reduced pressure. The residue is degassed under high vacuum to yield the ethyl-2-O-(2-acetyloxy-benzoyl)-3,5,6-tri-O-benzyl-D-glucofuranoside of the formula

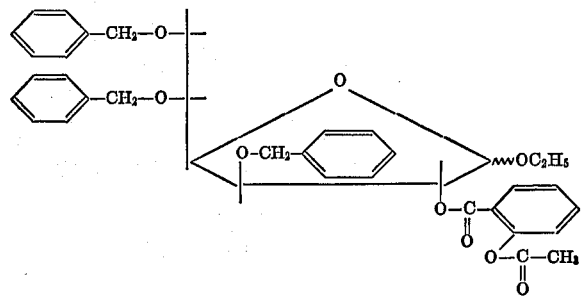

$[\alpha]_D^{20} = -8° \pm 1°$ (c.=1.2 in chloroform).

EXAMPLE 27

A solution of 55.1 g. of ethyl-2-O-(2-acetyloxy-benzoyl)-3,5,6-tri - O - benzyl - D - glucofuranoside in 1000 ml. of a 1 N ethanolic hydrogen chloride solution is allowed to stand for 16 hours at room temperature, then evaporated under reduced pressure. The residue is taken up in diethyl ether and the ether solution is washed with a saturated aqueous sodium hydrogen carbonate solution and water, dried over sodium sulfate and evaporated under reduced pressure (water jet pump). The residue is purified by thin-layer chromatography (silica gel PF 254 of Merck, Darmstadt); with an 85:15-mixture of chloroform and ethyl acetate the pure ethyl-2-O-salicyloyl-3,5,6-tri-O-benzyl-D-glucofuranoside of the formula

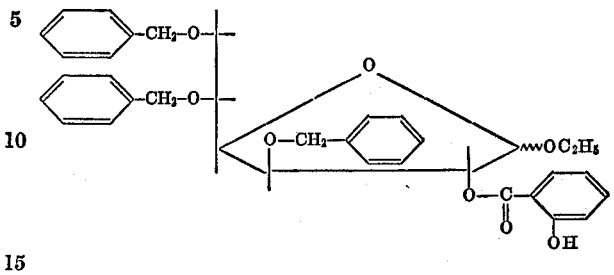

is obtained as a viscous yellowish oil, $[\alpha]_D^{20} = +19° \pm 0.5°$ (c.=1.8 in chloroform); thin layer chromatography (silica gel SL 254 of Merck, Dramstadt; system: chloroform/ethyl acetate 85:15): $R_f$=0.8.

EXAMPLE 28

A solution of 33.0 g. of 1,2-O-isopropylidene-3-O-methyl - 5,6 - di - O - (2-acetyloxy-benzoyl) - α - D-glucofuranose in 500 ml. of 1 N ethanolic hydrogen chloride solution is allowed to stand at room temperature for 15 hours. The major portion of the ethanolic hydrogen chloride is distilled off under water jet vacuum, the residue is neutralized at 0–5° with a saturated aqueous sodium hydrogen carbonate solution and extracted with diethyl ether. The ether extract is washed with a saturated aqueous sodium hydrogen carbonate solution and water, dried over sodium sulfate and evaporated under reduced pressure. The residue is purified by thin-layer chromatography (silica gel PF 254 of Merck, Darmstadt) and the pure ethyl - 3 - O - methyl-5,6-di-O-salicyloyl-D-glucofuranoside of the formula

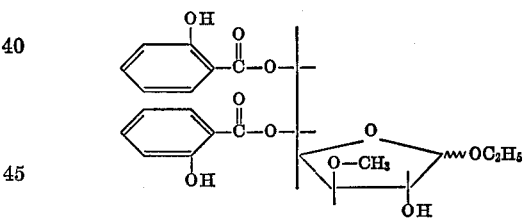

is eluted as a yellow oil with a 85:15-mixture of chloroform and ethyl acetate, $[\alpha]_D^{20} = -30° \pm 2°$ (c.=0.47 in chloroform). The resulting anomer mixture is separated by thin-layer chromatography (silica gel SL 254 of Merck, Darmstadt; system: chloroform/ethyl acetate 85:15); the β-anomer shows an $R_f$-value of 0.25, the α-anomer an $R_f$-value of 0.52.

The starting material can be prepared as follows:

A solution of 22.4 g. of 1,2-O-isopropylidene-3-O-methyl-α-D-glucofuranoside in 90 ml. of pyridine and 45 ml. of methylene chloride is treated, while stirring, within a period of 45 minutes dropwise with a solution of 44.5 g. of 2-acetyloxy-benzoic acid chloride in 45 ml. of methylene chloride. The reaction is allowed to proceed at room temperature for another 30 minutes and the reaction mixture is diluted with 20 ml. of water and evaporated under reduced pressure. The residue is extracted with diethyl ether; the ether extracts are washed with ice-cold 2 N hydrochloric acid, water, a saturated aqueous sodium hydrogen carbonate solution and water, dried over sodium sulfate and filtered through 70 g. of aluminum oxide ("Woelm"; basic, activity I). The filtrate is evaporated under water jet vacuum; the residue represents the 1,2-O-isopropylidene-3-O-methyl - 5,6 - di-O-(2-acetyloxybenzoyl)-α-D-glucofuranose, thin-layer chromatography (silica gel; system: chloroform/ethyl acetate 85:15): $R_f$=0.50, which is used without further purification.

We claim:

1. A member selected from the group consisting of hexafuranose compounds of the formula

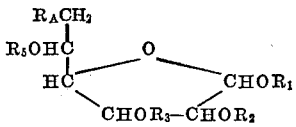

wherein $R_A$ is hydrogen or $R_6$—O—; each of R, $R_1$, $R_2$, $R_3$, $R_5$ and $R_6$ is hydrogen, lower alkyl, hydroxy-lower alkyl, lower alkoxy-lower alkyl, lower alkenyl, lower alkinyl, cycloalkyl of 3–7 ring members, cycloalkenyl of 5–7 ring members, cycloalkyl- or cycloalkenyl-lower alkyl, cycloalkyl- or cycloalkenyl-lower alkenyl; $R_1$ is also phenyl-lower alkyl or phenyl-lower alkyl substituted by halogen, lower alkoxy, lower alkyl, or trifluoromethyl; each of $R_2$, $R_3$, $R_5$ and $R_6$ is also phenyl or phenyl-substituted by the above defined phenyl substituents, phenyl-lower alkyl or phenyl-lower alkyl substituted by the above phenyl substituents, or acyl of lower alkane or lower-alkene-mono- or dicarboxylic acid, with the proviso that at least one of $R_2$, $R_3$, $R_5$ and $R_6$ is 2-R—O-benzoyl or 2-R—O-benzoyl-substituted by the above phenyl substituents in which R is as defined above and also phenyl- or phenyl-substituted by the above phenyl substituents or the above acyl residue, and wherein at least one of the groups $R_1$, $R_2$, $R_3$, $R_5$ and $R_6$ is not hydrogen, and pharmaceutically acceptable, non-toxic salts of such compounds having salt-forming groups.

2. Compounds according to claim 1, being a D-glucofuranose compound of the formula

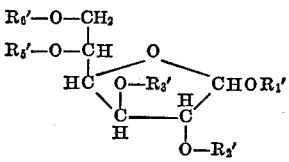

in which $R_1'$ represents a member selected from the group consisting of hydrogen and lower alkyl, $R_2'$ stands for a member selected from the group consisting of hydrogen and the acyl residue of a lower alkane carboxylic acid, each of $R_3'$, $R_5'$, and $R_6'$ stands for a member selected from the group consisting of salicyloyl, O-lower alkanoyl-salicyloyl, lower alkyl, lower alkenyl, benzyl and benzyl substituted by a member selected from the group consisting of lower alkyl, lower alkoxy, trifluoromethyl and halogeno; $R_3'$ is also hydrogen, and $R_6'$ is also phenyl or phenyl-substituted by the above defined phenyl substituents, with the proviso that at least one of $R_3'$, $R_5'$ and $R_6'$ is salicyloyl or O-lower alkanoyl-salicyloyl.

3. Compounds according to claim 1, in which $R_1$ is hydrogen or lower alkyl; $R_A$ is hydrogen or $R_6$—O—; and each of $R_2$, $R_3$, $R_5$ and $R_6$ is hydrogen, lower alkyl, lower alkenyl, phenyl, phenyl-substituted by lower alkyl, lower alkoxy, halogen or trifluoromethyl, benzyl, benzyl-substituted by lower alkyl, lower alkoxy, halogen or trifluoromethyl and the acyl residue of a lower alkane mono- or di-carboxylic acid, with the proviso that at least one of $R_2$, $R_3$, $R_5$ and $R_6$ is unsubstituted 2-R—O-benzoyl or 2-R—O-benzoyl substituted by halogen, lower alkoxy, trifluoromethyl or lower alkyl, wherein R is hydrogen, lower alkyl, benzyl or acyl of a lower alkane carboxylic acid, and at least one of $R_2$, $R_3$, $R_5$ and $R_6$ is not hydrogen and pharmaceutically acceptable non-toxic salts of such compounds having a salt-forming group.

4. Compounds according to claim 1 and being lower alkyl - 2 - O—$R_2''$—3-O—$R_3''$—5-O—$R_5''$—6-O—$R_6''$—D-glucofuranosides, in which $R_2''$ represents a member selected from the group consisting of hydrogen, lower alkanoyl and carboxy-lower alkanoyl, one or two of the groups $R_3''$, $R_5''$ and $R_6''$ stand for salicyloyl and each of the others represents a member selected from the group consisting of lower alkyl, benzyl and benzyl substituted by a member selected from the group consisting of lower alkyl, lower alkoxy and halogeno, whereby $R_3''$ also stands for hydrogen, and $R_6''$ also stands for phenyl and phenyl substituted by lower alkyl, lower alkoxy and halogeno.

5. A compound according to claim 1 and being ethyl-3-O-n-propyl-5,6-di-O-salicyloyl-D-glucofuranoside.

6. A compound according to claim 1 and being n-butyl-3-O-n-propyl-5,6-di-O-salicyloyl-D-glucofuranoside.

7. 1,2-O-isopropylidene - 3 - O - n - propyl-5,6-di-O-(O-acetyl-salicyloyl)-α-d-furanose.

8. A hexafuranose compound of the formula

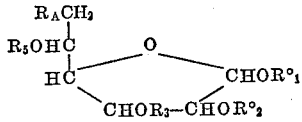

in which $R_1°$ and $R_2°$ together represent isopropylidene or benzylidene; $R_A$ is hydrogen or $R_6$—O—; each of R, $R_3$, $R_5$ and $R_6$ is hydrogen, lower alkyl, hydroxy-lower alkyl, lower alkoxy-lower alkyl, lower alkenyl lower alkinyl, cycloalkyl or 3–7 ring members, cycloalkenyl of 5–7 ring members, cycloalkyl- or cycloalkenyl 1-lower alkyl, cycloalkyl- or cycloalkenyl-lower alkenyl, phenyl or phenyl substituted by halogen, lower alkyl, lower alkoxy, or trifluoromethyl, and acyl residue of lower alkane or lower-alkene-mono- or dicarboxylic acid, with the proviso that at least one of $R_3$, $R_5$ and $R_6$ is 2-R—O-benzoyl or 2-R—O-benzoyl-substituted by the above defined phenyl substituents; each of $R_3$, $R_5$ and $R_6$ is also phenyl-lower alkyl or phenyl-lower alkyl substituted by the above defined phenyl substituents, and wherein at least one of the groups $R_3$, $R_5$ and $R_6$ is not hydrogen.

9. A compound as claimed in claim 8 in which $R_1°$ and $R_2°$ together represent isopropylidene or benzylidene; $R_A$ is hydrogen or $R_6$—O—; and each of $R_3$, $R_5$ and $R_6$ is hydrogen, lower alkyl, lower alkenyl, phenyl, phenyl-substituted by lower alkyl, lower alkoxy, halogen or trifluoromethyl, benzyl, benzyl-substituted by lower alkyl, lower alkoxy, halogen or trifluoromethyl and the acyl residue of a lower alkane mono- or dicarboxylic acid, with the proviso that at least one of $R_3$, $R_5$ and $R_6$ is unsubstituted 2-R—O benzoyl or 2-R—O-benzoyl substituted by halogen, lower alkoxy, trifluoromethyl or lower alkyl, wherein R is hydrogen, lower alkyl, benzyl or acyl or a lower alkane carboxylic acid, and at least one of $R_3$, $R_5$ and $R_6$ is not hydrogen.

10. A compound as claimed in claim 8, in which $R_1°$ and $R_2°$ together represent isopropylidene; $R_A$ is hydrogen or $R_6$—O—; each of $R_3$, $R_5$ and $R_6$ is salicyloyl, O-lower alkanoyl-salicyloyl, lower alkyl, lower alkenyl, benzyl and benzyl substituted by a member selected from the group consisting of lower alkyl, lower alkoxy, trifluoromethyl and halogeno; $R_3$ is also hydrogen and $R_6$ is also phenyl and phenyl-substituted by the above-defined phenyl substituents, with the proviso that at least one of $R_3$, $R_5$ and $R_6$ is salicyloyl or O-lower alkanoyl-salicyloyl.

References Cited
UNITED STATES PATENTS

| | | | |
|---|---|---|---|
| 3,538,077 | 11/1970 | Rossi | 260—210 R |
| 3,542,761 | 11/1970 | Rossi | 260—210 R |
| 3,154,536 | 10/1964 | Spiegelberg et al. | 260—210 R |
| 3,157,634 | 11/1964 | Druey et al. | 260—210 R |
| 3,183,247 | 5/1965 | Kiss et al. | 260—210 R |
| 3,196,147 | 7/1965 | Kiss et al. | 260—210 R |
| 3,494,913 | 2/1970 | Rossi | 260—210 R |
| 3,530,113 | 9/1970 | Rossi | 260—210 R |
| 3,592,808 | 7/1971 | Theander | 260—209 R |

LEWIS GOTTS, Primary Examiner

J. R. BROWN, Assistant Examiner

U.S. Cl. X.R.

260—234 R; 424—180

PO-1050
(5/69)

6804/1+2

UNITED STATES PATENT OFFICE
CERTIFICATE OF CORRECTION

Patent No. 3,781,267   Dated December 25, 1973

Inventor(s) Roland Jaques et al

It is certified that error appears in the above-identified patent and that said Letters Patent are hereby corrected as shown below:

Column 36, line 9, delete "furanose" and substitute --- glucofuranose ---

Signed and sealed this 17th day of September 1974.

McCOY M. GIBSON, JR.
Attesting Officer

C. MARSHALL DANN
Commissioner of Patents aaa